US012431251B2

(12) United States Patent
Xie et al.

(10) Patent No.: US 12,431,251 B2
(45) Date of Patent: Sep. 30, 2025

(54) METHOD FOR MONITORING FAILURE OF COATED PARTICLES IN FUEL ELEMENTS IN CORE OF PEBBLE-BED HIGH-TEMPERATURE GAS-COOLED REACTOR

(71) Applicant: Tsinghua University, Beijing (CN)

(72) Inventors: Feng Xie, Beijing (CN); Yu Wang, Beijing (CN); Jianzhu Cao, Beijing (CN); Bing Liu, Beijing (CN); Bing Xia, Beijing (CN); Fu Li, Beijing (CN); Jiejuan Tong, Beijing (CN); Yujie Dong, Beijing (CN); Zuoyi Zhang, Beijing (CN)

(73) Assignee: Tsinghua University, Beijing (CN)

( * ) Notice: Subject to any disclaimer, the term of this patent is extended or adjusted under 35 U.S.C. 154(b) by 408 days.

(21) Appl. No.: 18/176,248

(22) Filed: Feb. 28, 2023

(65) Prior Publication Data
US 2023/0274847 A1    Aug. 31, 2023

(30) Foreign Application Priority Data
Feb. 28, 2022    (CN) .......................... 202210188844.8

(51) Int. Cl.
G21C 1/07        (2006.01)
G21C 17/10       (2006.01)
(52) U.S. Cl.
CPC ............. *G21C 17/102* (2013.01); *G21C 1/07* (2013.01)
(58) Field of Classification Search
CPC ...................................................... G21C 1/07
See application file for complete search history.

(56) References Cited

U.S. PATENT DOCUMENTS 3,798,123 A * 3/1974 Lindemer .............. G21C 3/626
                                                   252/639
3,842,283 A * 10/1974 Chenebault ............ G21C 17/07
                                                   376/253
(Continued)

FOREIGN PATENT DOCUMENTS

CN        101740147 A  *  6/2010
CN        103055623 A  *  4/2013
(Continued)

OTHER PUBLICATIONS

Wang, Yu, et al. "Inventories of Short-Lived Fission Gas Nuclides in Nuclear Reactors." Energies 16.6 (2023): 2530. (Year: 2023).*
(Continued)

*Primary Examiner* — Lily C Garner
(74) *Attorney, Agent, or Firm* — Hanley, Flight & Zimmerman, LLC

(57) ABSTRACT

The present disclosure relates to a method for monitoring failure of coated particles in fuel elements in a core of a pebble-bed high-temperature gas-cooled reactor, which is related to the technical field of nuclear reactor engineering and includes the following steps: S11, calculating an inventory of a short-lived noble gas fission nuclide; S12, obtaining a ratio of a release rate to a birth rate of the short-lived noble gas fission nuclide based on a temperature of the fuel elements using a Booth diffusion and release model; S13, deriving a theoretical expression for an activity concentration of the short-lived noble gas fission nuclide in a primary circuit using a migration model of the nuclide in the primary circuit; S14, obtaining an experimental measurement value of the activity concentration of the short-lived noble gas fission nuclide in the primary circuit at a sampling moment by gas sampling; S15, optimally calculating a failure fraction of the coated particles in the fuel elements and a share of uranium contamination in the matrix graphite in the core (Continued)

based on the theoretical expression and the experimental measurement value. The present disclosure can provide key parameters for the performance and status of the fuel elements in the core, which are required for radiation safety studies, source term calculations and accident analysis of the pebble-bed high-temperature gas-cooled reactor.

20 Claims, 4 Drawing Sheets

(56) References Cited

U.S. PATENT DOCUMENTS 4,077,838 A * 3/1978 Lindemer .............. G21C 3/626
252/639
4,495,143 A * 1/1985 Gross .................. G21C 17/048
376/253

FOREIGN PATENT DOCUMENTS

| CN | 110534219 A | * | 12/2019 | |
| CN | 111508573 A | * | 8/2020 | ............. G16C 60/00 |

OTHER PUBLICATIONS

Mphofu, Amogelang Aubrey. Neutronics and fuel performance analysis of TRISO-based accident tolerant fuel for PWRs. Diss. North-West University (South Africa)., 2023. (Year: 2023).*

Marmier, Alain. "Sustainability and efficiency improvements of gas-cooled high temperature reactors." (2012). (Year: 2012).*

Shahbazi, Shayan, and David Grabaskas. A Pathway for the Development of Advanced Reactor Mechanistic Source Term Modeling and Simulation Capabilities. No. ANL/NSE-21/21. Argonne National Lab.(ANL), Argonne, IL (United States), 2021. (Year: 2021).*

Leotlela, Moebetsi J. Investigation of the Release of Gaseous Fission Products From Pebble Bed Molecular Reactor's Triso Coated Fuel Particle During the HFR-K5 Fuel Irradiation Test. University of the Witwatersrand, Johannesburg (South Africa), 2010. (Year: 2010).*

Verfondern, Karl, Heinz Nabielek, and James M. Kendall. "Coated particle fuel for high temperature gas cooled reactors." Nuclear Engineering and Technology 39.5 (2007): 603. (Year: 2007).*

* cited by examiner

METHOD FOR MONITORING FAILURE OF COATED PARTICLES IN FUEL ELEMENTS IN CORE OF PEBBLE-BED HIGH-TEMPERATURE GAS-COOLED REACTOR

CROSS-REFERENCE TO RELATED APPLICATIONS

This application claims priority to Chinese Patent Application No. 202210188844.8, filed on Feb. 28, 2022, which is hereby incorporated by reference in its entirety.

TECHNICAL FIELD

The present disclosure relates to the technical field of reactor engineering, and specifically relates to a method for monitoring failure of coated particles in fuel elements in a core of a pebble-bed high temperature gas cooled reactor.

BACKGROUND

The high temperature gas-cooled reactor (HTGR) is the first stage of the very high temperature reactor (VHTR), which possesses the safety characteristics of a Generation IV advanced nuclear reactor. A modular pebble-bed high-temperature gas-cooled reactor adopts helium as the coolant and graphite as the moderator, with helium temperature at core outlet in the range of 700° C. to 950° C. One important feature of the modular pebble-bed high-temperature gas-cooled reactor is the high temperature, i.e., the helium temperature at core outlet can reach to 700° C. to 950° C. In addition to high efficiency in power generation and cogeneration, the modular pebble-bed high-temperature gas-cooled reactor is widely used in high-temperature thermal processes, such as hydrogen production by thermal decomposition and hydrolysis and seawater desalination.

The inherent safety is another important feature of the modular pebble-bed high-temperature gas-cooled reactor and is achieved through the use of the fuel elements in the core of the high-temperature gas-cooled reactor, such as the Tristructural ISOtropic (TRISO) coated particles embedding in the spherical fuel elements. Although the high performance of the fuel elements essentially eliminates the core meltdown accident which may happen in pressurized water reactors and retains the majority of fission-generated radionuclides in the fuel elements, a small amount of fission products is still released from the core into the primary helium coolant due to the presence of uranium contamination and failed coated particles in the fuel elements.

Based on the stable operation of the helium purification system in HTGR, the level of impurities and radioactive concentrations in the primary circuit helium coolant are kept within certain ranges and the corrosion of the primary circuit equipment and pipes is also well mitigated. However, there is inevitably some radioactivity in the primary circuit. There are five main categories of radioactive source terms concerned in the primary circuit of HTGR: tritium, carbon-14, fission products, activation products, and radioactive dust.

In addition to the ternary fission of fissionable nuclides in the fuel elements in the core of the reactor, tritium and carbon-14 also originate from the activation of impurity elements in other materials in the reactor. Tritium and carbon-14 are both pure β-particle emitting radionuclides and can be measured after the relatively complex sample preparation process such as separation and purification after sampling from the primary circuit. The activation products mainly reflect the neutron activation properties of the materials in the reactor and do not provide direct information on the performance of the fuel elements in the core. The composition and morphology of the radioactive dust are complex, making it relatively difficult to sample, measure and calculate the radioactivity of dust with accuracy. Fission products are derived from the fission reactions of fissionable nuclides in the core and can directly reflect the information about the performance and status of the fuel element in the core. The fission products include noble gas fission nuclides and solid fission nuclides. The solid fission nuclides have relatively active chemical properties and complex chemical states, which makes the deposition and adsorption obviously during the release from the core into the primary circuit, as well as the non-uniform distribution during the helium flow in the primary circuit. Thus, the accurate theoretical calculations and experimental measurements for the transport of solid fission products are very difficult. However, the calculation of the diffusion and release process of gas fission nuclides is simpler than those of other four items, and is the only feasible indicator for monitoring the performance and status (the failure fraction F of the coated particles and the share C of uranium contamination) of the fuel elements in the core of pebble-bed high-temperature gas-cooled reactor currently. Firstly, gas fission nuclides are mainly noble gas fission nuclides which has stable chemical states and is easy to meet the assumption of atomic diffusion and release. Secondly, the half-life of noble gas fission nuclides is generally short. The half-life of the short-lived noble gas fission nuclide that we concerned are mostly on the order of a few of minutes to days. The time for the short-lived noble gas fission nuclide in the core and primary circuit to reach equilibrium is relatively short. Therefore, while ensuring the calculation accuracy, the theory of equilibrium state can be used to greatly simplify the various steps of theoretical calculation. Finally, as the noble gas fission nuclides are present in gas form in the primary circuit coolant helium and uniformly distributed in the helium, so, the primary circuit gas can be extracted and detected directly using a γ spectrometer.

TABLE 1

Categories and characteristics of radioactive source terms in the primary circuit

| Categories | Characteristics |
| --- | --- |
| Tritium and Carbon-14 | Originating from the ternary fission in the fuel elements and the activation reaction of impurity elements in materials in the core; pure β-particle emitting radionuclides; complex sample preparation and measurement. |
| Activation Products | Originating from the neutron activation reactions of the materials in the core, cannot reflect the information about the performance of the fuel elements in the core. |
| Radioactive Dust | Complex composition and morphology; difficult theoretical and quantitative calculations; cumbersome and complex sample preparation and measurement. |
| Fission Products | Solid fission nuclides can reflect the performance of the fuel elements; relatively active chemical properties and complex chemical states; significant deposition and adsorption phenomena. Gas fission nuclides can reflect the performance of the fuel elements in the core; usually with a relatively short half-life; stable chemical state; uniformly distributed as gas form in the primary circuit; sampling easily. |

There is no established method all over the world for calculating and monitoring the failure fraction of the coated particles and uranium contamination in the fuel elements in the core of the modular pebble-bed high-temperature gas-cooled reactor currently.

SUMMARY

In order to overcome the defects in the prior art, the present disclosure provide a method for monitoring failure of the coated particles in fuel elements in a core of a pebble-bed high-temperature gas-cooled reactor. With this method, the failure fraction of the coated particles and uranium contamination in the matrix graphite in fuel elements in the core of the pebble-bed high-temperature gas-cooled reactor can be determined, thereby providing key performance parameters of the fuel elements in the core for radiation safety studies, source term calculations, accident analysis, etc.

A method for monitoring failure of coated particles in fuel elements in a core of a pebble-bed high-temperature gas-cooled reactor, including:

S10, obtaining actual state information of a pebble-bed high-temperature gas-cooled reactor from the pebble-bed high-temperature gas-cooled reactor in operation;

S11, determining an inventory $I_i$ of a short-lived fission gas nuclide in a nuclear fission reactor;

S12, obtaining a ratio of a release rate to a birth rate $R/B_i$ of the short-lived fission gas nuclide based on a temperature information of the fuel elements in a core using a Booth diffusion and release model;

S13, deriving a theoretical expression $A_i(F,C)$ for an activity concentration of the short-lived fission gas nuclide in a primary circuit using a migration model of the nuclide in the primary circuit;

S14, obtaining an experimental activity concentration $a_i$ of the short-lived fission gas nuclide in the primary circuit at a sampling moment by measuring gas in a helium purification system in the primary circuit;

S15, optimally calculating a failure fraction F of the coated particles in the fuel elements in the core and a share C of uranium contamination in a matrix graphite using a least squares method based on the theoretical expression $A_i(F,C)$ and the experimental measurement value $a_i$;

S16, maintaining a current operating state of the pebble-bed high-temperature gas-cooled reactor when the failure fraction F of the coated particles in the fuel elements in the core is less than a first preset value; adjusting operating parameters of the pebble-bed high-temperature gas-cooled reactor when the failure fraction F of the coated particles in the fuel elements in the core is larger than or equal to the first preset value and less than a second preset value, so that the failure fraction F of the coated particles in the fuel elements in the core is reduced to less than the first preset value; initiating a shutdown procedure of the pebble-bed high-temperature gas-cooled reactor when the failure fraction F of the coated particles in the fuel elements in the core is larger than or equal to the second preset value for more than a preset duration.

Furthermore, in the method, the inventory $I_i$, is determined using a IPRFGN model or conventional point-depletion burnup equations, and the IPRFGN model is a simplification of the point-depletion burnup equations and describes cores of various types of nuclear fission reactors as a point reactor with several key parameters.

Furthermore, in the method, the Booth diffusion and release model in the step S12 is:

$$\begin{cases} 0 = D\left(\frac{\partial^2 c}{\partial r^2} + \frac{2}{r}\frac{\partial c}{\partial r}\right) - \lambda c + B \\ \frac{\partial c}{\partial t}|_{r=0} = 0 & t > 0 \\ c(r=a, t) = 0 & t > 0 \\ c(r, t = 0) = 0 & 0 \le r \le a \end{cases}$$

where:
a is the radius of the equivalent sphere, cm;
c is the atom number of nuclides per unit volume, i.e. the nuclide concentration, $cm^{-3}$;
B is the number of atoms produced per unit volume, i.e. the birth rate per unit volume, $cm^{-3}s^{-1}$.
D is the diffusion coefficient of the nuclide, $cm^2/s$.
t is the time of diffusion of the nuclide, s;
r is the distance away from the center of the sphere, cm;
$\lambda$ is the decay constant of the nuclide, $s^{-1}$;
the analytical solution is, $$\frac{R}{B} = \sqrt[3]{\frac{D}{\lambda a^2}}\left(\coth\left(\sqrt{\frac{\lambda a^2}{D}}\right) - \sqrt{\frac{D}{\lambda a^2}}\right),$$

where:
R/B is the ratio of the release rate to the birth rate of a nuclide in the equivalent sphere.
in $D'=D/a^2$, D' is the reduced diffusion coefficient of a nuclide, which can be expressed using the Arrhenius formula:

$$D' = D'_0 e^{-\frac{Q}{RT}}$$

where:
$D_0'$ is the frequency factor, $s^{-1}$;
Q is the activation energy, J/mol;
R is the ideal gas constant, J/(mol·K);
T is the average temperature of the material in which the nuclide diffuses, K,
considering different burnup effects and parent nucleus assisted diffusion, the correction formula for the ratio of the release rate to the birth rate is as follows:

$$\frac{R}{B} = 3\left(\frac{1}{\Gamma_1}\left(\frac{\coth\sqrt{\mu_1}}{\sqrt{\mu_1}} - \frac{1}{\mu_1}\right) + \frac{1}{\Gamma_2}\left(\frac{\coth\sqrt{\mu_2}}{\sqrt{\mu_2}} - \frac{1}{\mu_2}\right)\right)f_{BU}$$

$$\Gamma_1 = 1 - \frac{\mu_1}{\mu_2}, \Gamma_2 = 1 - \frac{\mu_2}{\mu_1}, \mu_1 = \frac{\lambda_1}{D'_1}, \mu_2 = \frac{\lambda_2}{D'_2}$$

where:
$f_{BU}$ is the fuel burnup correction factor, % FIMA;
$\Gamma_1, \Gamma_2$ and $\mu_1, \mu_2$ are the defined calculation parameters;
$D'_1, D'_2$ are the reduced diffusion coefficients, $s^{-1}$; and the subscripts 1, 2 denote the nuclide considered and its parent nuclei, respectively.

Furthermore, in the method, in the step S12, the uranium-containing fractions of producing and releasing the short-lived fission gas nuclides into the primary circuit in the fuel elements includes four categories: the failed coated particles, $UO_2$ particles in the matrix graphite, matrix graphite grain, and amorphous carbon; the failure fraction of the coated particles in the fuel elements of the pebble-bed high-temperature gas-cooled reactor is F; the share of uranium contamination in the matrix graphite in the fuel elements is C, the share of uranium contamination in matrix graphite due to the process contamination during the manufacture of the fuel elements is $C_{extra}$, the natural uranium contamination of the matrix graphite grain and amorphous carbon is $C_{natrue}$, so an uranium fraction in the coated particles of all the fuel elements is $(1-C_{extra}-C_{natrue})$, and an uranium fraction in the failed coated particles in which the short-lived fission gas nuclides will diffuse is $F\times(1-C_{extra}-C_{natrue})$, therefore, so that the equivalent ratio of the release rate to the birth rate of the short-lived fission gas nuclides in all the fuel elements in the core is:

$$\frac{R}{B}\bigg|_{total} = \left(F(1-C_{extra}-C_{nature})\frac{R}{B}\bigg|_{kernel} + C_{extra}\frac{R}{B}\bigg|_{extra} + C_{nature}\frac{R}{B}\bigg|_{nature}\right)$$

where:

$$\frac{R}{B}\bigg|_{total}$$

is the equivalent ratio of the release rate to the birth rate of the short-lived fission gas nuclides in all the fuel elements in the core;

$$\frac{R}{B}\bigg|_{kernel}$$

is the equivalent ratio of the release rate to the birth rate of the short-lived fission gas nuclides in the failed coated particles in the fuel elements in the core;

$$\frac{R}{B}\bigg|_{extra}$$

is the equivalent ratio or the release rate to the birth rate of the short-lived fission gas nuclides from the uranium contamination in matrix graphite due to the process contamination during the manufacture of the fuel elements;

$$\frac{R}{B}\bigg|_{natrue}$$

is the equivalent ratio of the release rate to the birth rate of the short-lived fission gas nuclide from natural uranium contamination in the fuel elements in the core, $$\frac{R}{B}\bigg|_{nature} = 0.9998\left(0.995\frac{R}{B}\bigg|_{grain} + 0.005\frac{R}{B}\bigg|_{amorphous}\right) + 0.0002,$$

where:

$$\frac{R}{B}\bigg|_{grain}$$

is the equivalent ratio of the release rate to the birth rate of the short-lived fission gas nuclide in matrix graphite grain in the fuel elements; and $$\frac{R}{B}\bigg|_{amorphous}$$

is the equivalent ratio of the release rate to the birth rate of the short-lived fission gas nuclides in the amorphous carbon in the fuel elements.

Furthermore, in the method, when calculating the equivalent ratios of the release rate to the birth rate of the short-lived fission gaseous nuclide in the failed coated particles, $UO_2$ particles in the matrix graphite, matrix graphite grain and amorphous carbon in the fuel elements in the core, the temperature distribution of the fuel elements needs to be taken into account, which can be calculated according to the following formula:

$$\frac{R}{B}\bigg|_{kernel} = \sum_i f_{k,T_i}\frac{R}{B}\bigg|_{kernel,T_i}$$

$$\frac{R}{B}\bigg|_{extra} = \sum_i f_{k,T_i}\frac{R}{B}\bigg|_{extra,T_i}$$

$$\frac{R}{B}\bigg|_{grain} = \sum_i f_{c,T_i}\frac{R}{B}\bigg|_{grain,T_i}$$

$$\frac{R}{B}\bigg|_{amorphous} = \sum_i f_{c,T_i}\frac{R}{B}\bigg|_{amorphous,T_i}$$

where, $$\frac{R}{B}\bigg|_{kernel,T_i}, \frac{R}{B}\bigg|_{extra,T_i}, \frac{R}{B}\bigg|_{grain,T_i}, \text{ and } \frac{R}{B}\bigg|_{amorphous,T_i}$$

are the equivalent ratios of the release rate to the birth rate of the short-lived fission gas nuclide at the temperatures $T_i$ corresponding to the failed coated particles, $UO_2$ particles in the matrix graphite, matrix graphite grain, and amorphous carbon in the fuel elements in the core, respectively;

$f_{c,T_i}$ is the fraction of the matrix graphite in the core with a temperature of $T_i$; and $f_{k,T_i}$ is the fraction of the failed coated particles in the fuel elements with the temperature of $T_i$.

Furthermore, in the method, the migration model of the short-lived fission gas nuclide in the primary circuit is:

$$\begin{cases} \dfrac{dC(t)}{dt} = \dfrac{R}{\lambda V} - \tau C(t) \\ C(0) = 0 \\ \tau = \lambda + \epsilon\dfrac{Q_\epsilon}{V} + \dfrac{\delta}{T} + \omega + \sigma_a\phi\dfrac{t_v}{T} \end{cases}$$

solution of the equation is, $$\begin{cases} C(t) = \dfrac{R}{\lambda V\tau}(1-e^{-\tau t}) \\ A(t) = \lambda C(t) = \dfrac{R}{V\tau}(1-e^{-\tau t}) \end{cases}$$

where:
C is the atom concentration of a nuclide in helium coolant in the primary circuit, $cm^{-3}$;
A is the theoretical expression of the activity concentration of a nuclide in helium coolant in the primary circuit, Bq/L;

R is the release rate of a nuclide from the reactor core, Bq/s;
λ is the decay constant of a nuclide, s$^{-1}$;
ε is the purification coefficient of a nuclide;
Q is the purification flow rate of the helium purification system, cm$^3$/s;
V is the total volume of helium in the primary circuit, L;
δ is the deposition coefficient of a nuclide per cycle;
T is the duration time per helium cycle, s;
ω is the leakage rate of helium in the primary circuit, s$^{-1}$;
$\sigma_a$ is the neutron absorption cross section of a nuclide, cm$^2$;
Φ is the core effective neutron flux, cm$^{-2}$s$^{-1}$;
$t_v$ is the duration time for the helium across the core per cycle, s; and
τ is the equivalent removal rate, s$^{-1}$.

Furthermore, in the method, the short-lived fission gas nuclide in the step S13, when reaching equilibrium, the theoretical expression of the activity concentration of the short-lived fission gas nuclide in the primary circuit is:

$$A(t) = \frac{R}{V\tau}$$

where, A is the theoretical expression of the activity concentration, Bq/L, R is the release rate of a nuclide from the core, Bq/s, V is the total volume of helium in the primary circuit, L, and τ is the equivalent removal rate, s$^{-1}$.

Furthermore, in the method, in the step S14, the specific steps of the experimental measurement are:

the helium purification system is connected to the primary circuit; at the inlet of the helium purification system, a portion of the gas from the primary circuit enters the experimental loop and is stored in a sample tank; the γ spectrum is measured by the HPGe detector. After the energy scale and efficiency scale calibration with a γ spectrum, the nuclides are identified and their activities are determined; finally, the experimental measurement value $a_i$ of the activity concentration of the short-lived fission gas nuclide in the primary circuit at the sampling moment is derived after correction of a sampling time period.

Furthermore, in the method, in the step S15, the optimization equation is:

$$S = \Sigma_{i=1}^{n}(A_i - a_i)^2$$

where:
S is the optimization function, and the optimization objective is to the minimum S value;
n is the total number of the short-lived noble fission gas nuclide considered;
$a_i$ is the experimental measurement value of the activity concentration of the short-lived noble fission gas nuclide i in the primary circuit, Bq/L;
$A_i$ is the theoretical expression of activity concentration of the short-lived noble fission gas nuclide i in the primary circuit. Bq/L:

$$A_i = \frac{(\lambda_i I_i)\frac{R}{B}|_{total,i}}{V\tau_i}$$

where:
$\lambda_i$ is the decay constant of the short-lived noble gas fission nuclide i, s$^{-1}$;
$I_i$ is the inventory of the short-lived noble gas fission nuclide i, Bq;
V is the total volume of helium in the primary circuit, L; and
τ is the equivalent removal rate, s$^{-1}$.

The method for monitoring failure of coated particles in fuel elements in a core of a pebble-bed high-temperature gas-cooled reactor according to the present disclosure has the following significant technical effects:

1. The method of calculating the inventory of the short-lived noble gas fission nuclide in the core, which is more simple and rapid and can meets the accuracy requirements of the engineering application, is adopted to process the diffusion and release model of fission nuclides in the pebble-bed high-temperature gas-cooled reactor, so that achieves the optimum estimate of the failure fraction of the coated particles in the fuel elements when simultaneously considering the three noble gas fission nuclides $^{85m}$Kr, $^{87}$Kr, and $^{88}$Kr jointly.

2. Based on the experimental system, the calibration of the sampling tank is implemented by the volume source, thus improving the experimental measurement method of the activity concentration of the noble gas fission nuclide in the primary circuit and its uncertainty calculation. Tus, the systematic method and system for calculating the failure fraction of the coated particles in the fuel elements in the core of pebble-bed high-temperature gas-cooled reactor are established.

3. In the present disclosure, by building a failure monitoring system of the coated particles in the fuel elements in the core of the pebble-bed high-temperature gas-cooled reactor, can provide timely information about the status of the reactor core. And if the failure rate exceeds the preset value, there will be an audible and visual alarm and other signals to prompt the operators to carry out the corresponding operation to ensure that the reactor is in the safe condition.

DETAILED DESCRIPTION

The present disclosure will now be described with reference to the specific embodiments and the drawings.

Figure 1A:
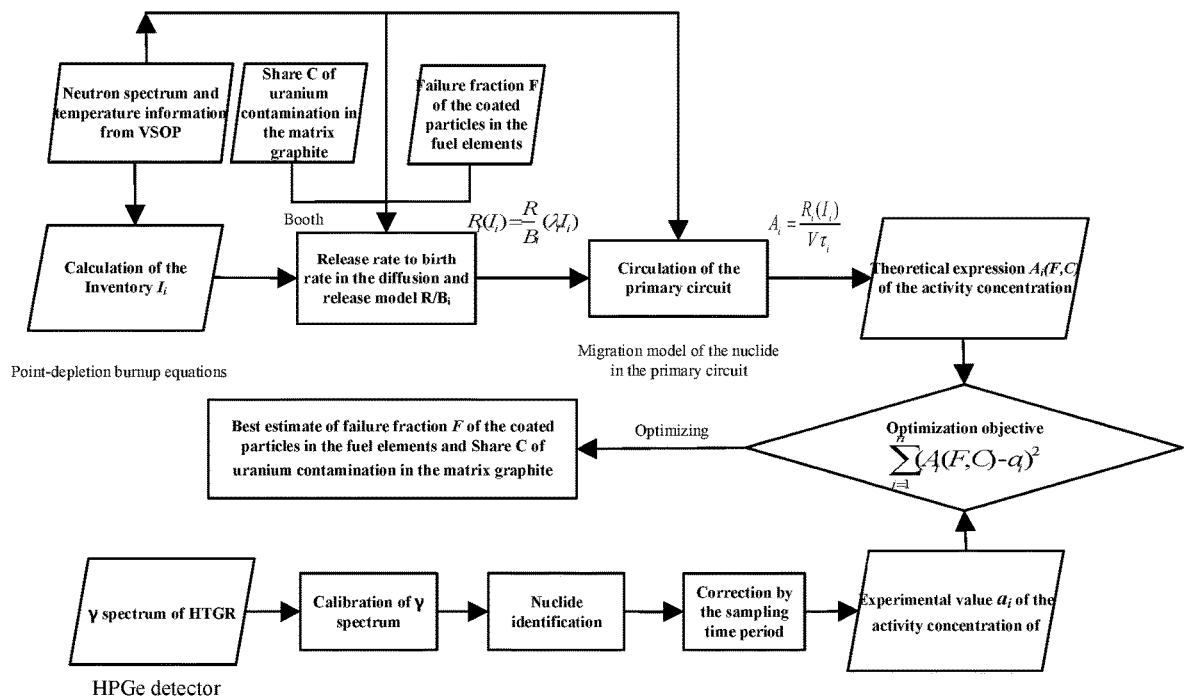
FIG. 1A is the schematic diagram of a method for determining a failure fraction of coated particles fuel elements in a core of a pebble-bed high-temperature gas-cooled reactor according to an embodiment of the present disclosure.
Figure 1B:
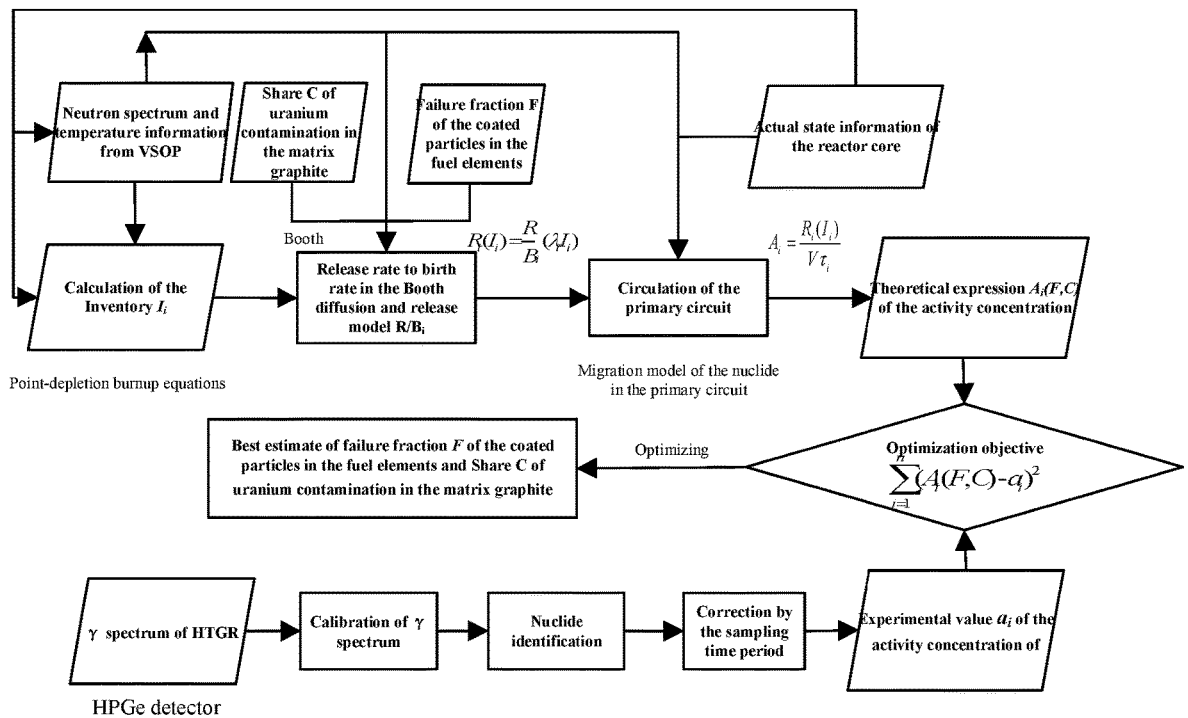
FIG. 1B is the schematic diagram of a method for determining a failure fraction of coated particles in fuel elements in a core of a pebble-bed high-temperature gas-cooled reactor according to another embodiment of the present disclosure.

The present disclosure provides a method for determining failure of coated particles in fuel elements in a core of a pebble-bed high-temperature gas-cooled reactor, the general idea of which is shown in FIG. 1A and FIG. 1B. The performance and status of the fuel elements in the core are monitored through the activity concentration of the noble gas fission nuclides in the primary circuit. The method of the present disclosure is divided into two parts: theoretical calculation and experimental measurement. Specifically, the predicted value $A_i(F,C)$ of the activity concentration of the short-lived noble gas fission nuclide in the primary circuit obtained from theoretical calculations, and the experimental value $a_i$ of the activity concentration of the short-lived noble gas fission nuclide in the primary circuit obtained from experimental measurements, are optimized using the least squares method to derive the best estimate of the failure fraction F of the coated particles in the fuel elements in the core and the best estimate of the share C of uranium contamination in the matrix graphite. It can be understood that the experimental value $a_i$ can also be seen as the actual measured value of the activity concentration of the nuclide, which is obtained during the actual operation of the pebble-bed high-temperature gas-cooled reactor (during the experiment).

The theoretical calculation procedure includes: obtaining the actual state information of the pebble-bed high-temperature gas-cooled reactor from the pebble-bed high-temperature gas-cooled reactor in operation (such as the reactor 1 and steam generator 2 in FIG. 4A or FIG. 4B), wherein the actual state information may include, for example, operating power, neutron flux, temperature and pressure. Then, the actual state information is processed with VSOP to obtain a neutron spectrum and a fuel temperature. The inventory $I_i$ of the short-lived noble gas fission nuclide is then obtained by solving the point burnup equations obtained from the neutron spectrum provided by the VSOP, the fuel temperature provided by the VSOP and the actual state information. The point burnup equations are solved using a IPRFGN simplified model or conventional point burnup calculation program such as KORIGEN. The ratio of the release rate to the birth rate $R/B_i$ of the short-lived noble gas fission nuclide is determined by combining the diffusion release process of the short-lived noble gas fission nuclide in the fuel elements (described by the Booth model) and the fuel elements temperature information (determined by the VSOP), as well as a uranium contamination in the matrix graphite and a failure fraction of the coated particles in the fuel elements. Then, the core release rate $R_i(I_i)$ of the short-lived noble gas fission nuclide in the primary circuit can be determined. The theoretical expression for the activity concentration $A_i(F,C)$ of the short-lived noble gas fission nuclide in the primary circuit is derived using the migration model of the nuclide in the primary circuit, the release rate $R_i(I_i)$, and an equivalent removal rate $\tau_i$ and the inventory determined from the actual state information. The theoretical expression $A_i(F,C)$ will be combined with the experimental measurement to derive the best estimate of the failure fraction of the coated particles in the fuel elements and the best estimate of the share of uranium contamination in the matrix graphite.

The experimental measurements are implemented by gas sampling and measurement from the helium purification system in the primary circuit. The flow of the experimental measurements includes: the $\gamma$ spectrum is calibrated with the energy scale and the efficiency scale to identify the nuclide and determine activity $a'_i$ of the nuclide. Finally, the experimental activity concentration $a_i$ of the short-lived noble gas fission nuclide in the primary circuit at the sampling moment is derived after the correction of the sampling time period. It should be noted that the above derivation can be achieved by the following equation.

$$a_i = a'_i \frac{\lambda_i t_s}{1 - e^{-\lambda_i t_s}}$$

where:)
$\lambda_i$ is the decay constant of a nuclide i, $s^{-1}$; and
$t_s$ is the sampling time period, s.

The optimization method uses the least squares method with an optimization function $S=\Sigma_{i=1}^{n}(A_i-a_i)^2$, where n is the total number of the short-lived noble gas fission nuclide, and $A_i$ is the theoretical expression of the activity concentration of the short-lived noble gas fission nuclide in the primary circuit. Using the least squares method, based on the theoretical expression $A_i$ for the activity concentration of the short-lived noble gas fission nuclide in the primary circuit and the experimental value $a_i$ for the activity concentration of the short-lived fission gas nuclide in the primary circuit, the best estimate of the failure fraction F of the coated particles in the fuel elements in the core and the best estimate of the share C of uranium contamination in the matrix graphite can be calculated.

The failure fraction F of the coated particles in fuel elements in the core and the share C of uranium contamination in the matrix graphite are important factors influencing the diffusion and release processes of the short-lived noble gas fission nuclide, which are key parameters in determining the magnitude of the activity concentrations of the short-lived noble gas fission nuclide in the helium coolant in the primary circuit. Therefore, the best estimate of the failure fraction F of the coated particles in fuel elements in the core and the best estimate of the share C of uranium contamination in the matrix graphite, obtained on the basis of the embodiments of this embodiment, can lead to an improved accuracy in promoting the radiation safety studies, source term calculations and accident analysis, etc., and thus to a more precisely safety adjustment of the pebble-bed high-temperature gas-cooled reactor. It should be noted that the best estimate of the share C of uranium contamination in the matrix graphite can be used to guide the improvement of the manufacture of core fuel elements (if the best estimate of the share C of uranium contamination in the matrix graphite is higher than the natural uranium contamination in the matrix graphite used, the manufacturing process of the fuel elements need to be improved so that the best estimate of the share C of uranium contamination is close to the natural uranium contamination in the matrix graphite).

It should be noted that the actual state information and the experimental measurement value can be detected, for example, by the detectors. And the detectors can include, for example, the first detector and the second detector, and the first detector detecting the actual state information and the second detector detecting the experimental measurement value. After the detectors has detected the actual state information and the experimental measurement value, the actual state information and experimental measurement value are sent to the processor connected to the detectors. After receiving the actual state information and the experimental measurement value, the processor processes the actual state information and the experimental measurement value using the method as described above to determine the best estimate of the failure fraction F of the coated particles in the fuel elements in the core, which is used to trigger the audible and visual alarm and/or to adjust the operating parameters of the pebble-bed high-temperature gas-cooled reactor. Specifically, the adjustment of the operating parameters of the pebble-bed high-temperature gas-cooled reactor can be, for example, that based on the interaction with the user terminal, the processor can display the best estimate of the failure fraction F of the coated particles in the fuel elements at the user terminal and to obtain the user's operating parameter adjustment strategy at the user terminal. The adjustment of the operating parameters of the pebble-bed high-temperature gas-cooled reactor is based on the operating parameter adjustment strategy.

Figure 2:
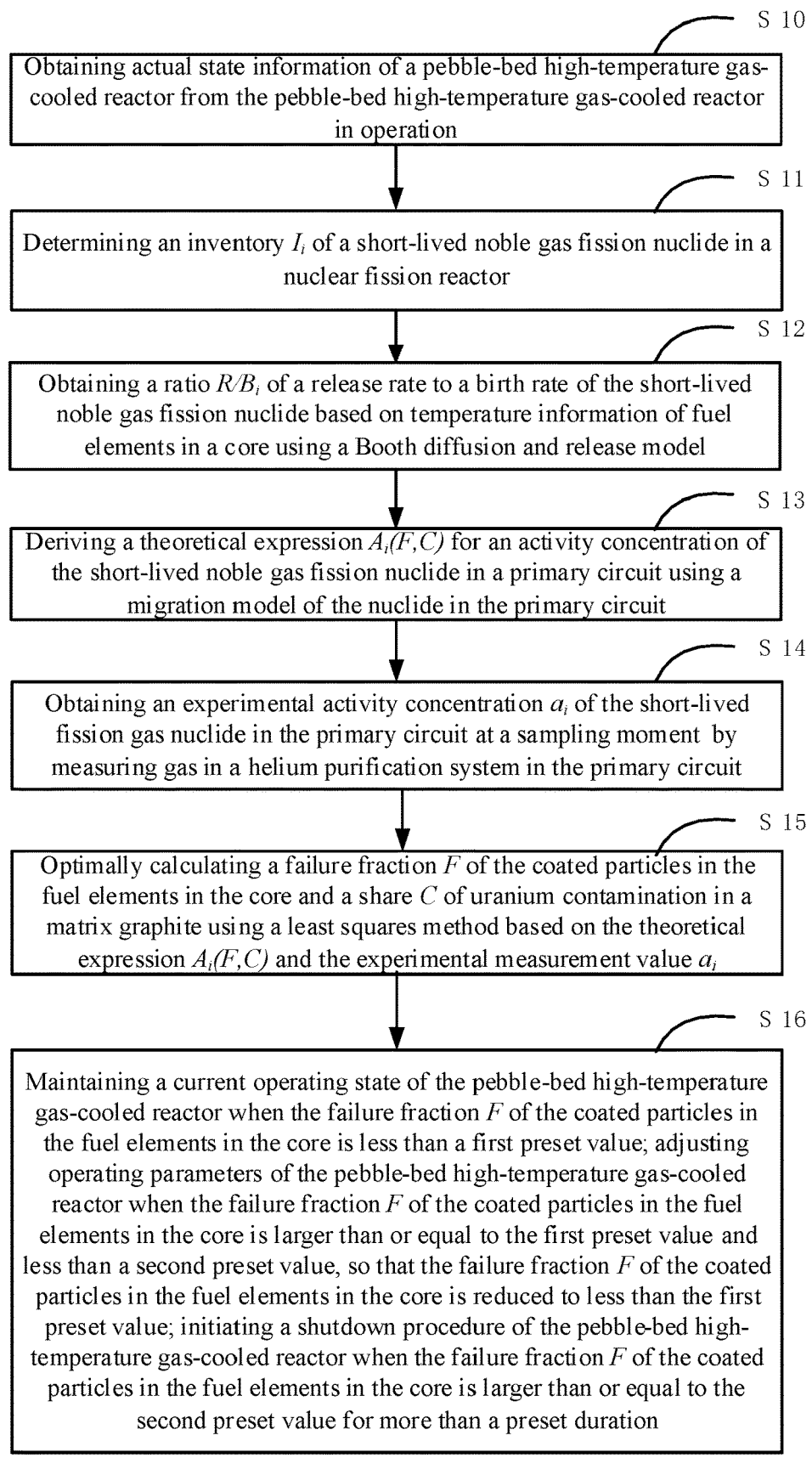
FIG. 2 is the flowchart of a method for determining a failure fraction of coated particles in fuel elements in a core of a pebble-bed high-temperature gas-cooled reactor according to an embodiment of the present disclosure.

FIG. 2 illustrates the flowchart of a method for determining a failure fraction of coated particles in fuel elements in a core of a pebble-bed high-temperature gas-cooled reactor provided in embodiments of the present disclosure, in which the process of determining the failure fraction of the coated particles in the fuel elements in the core of the pebble-bed high-temperature gas-cooled reactor is depicted. However, it can include more or fewer operations based on conventional or non-inventive efforts. The order of operations listed in the implementations is only one of the many orders of execution and does not mean to be the only order of execution. When an actual system or device product is executed, execution can be performed sequentially or in parallel according to the order described in the method of the implementation or figure, specifically including the following steps:

S10, obtaining the actual state information of a pebble-bed high-temperature gas-cooled reactor from the pebble-bed high-temperature gas-cooled reactor in operation.

This actual state information can be, for example, the temperature and pressure of helium coolant in the primary circuit, and reactor power, which can be detected by the first detector.

S11, determining an inventory $I_i$ of a short-lived noble fission gas nuclides in a nuclear fission reactor.

The point-depletion burnup equations are a mathematical model describing the nuclear reaction processes such as fission, transfer, decay and activation of nuclides (including fissionable nuclides, fissile nuclides, fission products and other nuclear reaction products, etc.) during nuclear fission and nuclear decay process. The point-depletion burnup equations are as follows:

$$\frac{dN_i}{dt} = \sum_{j=1}^{n_j} l_{ij}\lambda_j N_j + \Phi \sum_{j=1}^{N} f_{ij}\sigma_j N_j - (\lambda_i + \Phi\sigma_{a,i})N_i, \quad (1)$$

$$i = 1, 2, \ldots, N$$

in formula (1), $N_i$ is the atom concentration of the nuclide i, atoms/cm$^3$;

$N_j$ is the atom concentration of the precursor nucleus j or the fissionable nuclide j, atoms/cm$^3$;

$n_j$ is the total number of the corresponding precursor nucleus;

N is the total number of the fissionable nuclide considered;

$\lambda_i$ is the decay constant of the nuclide i, s$^{-1}$;

$\lambda_j$ is the decay constant of the nuclide j, s$^{-1}$;

$\sigma_{a,i}$ is the spectrally averaged neutron absorption cross section for the nuclide i, cm$^2$;

$\sigma_j$ is the spectrally averaged neutron fission cross section for the corresponding fissionable nuclide, cm$^2$;

$l_{ij}$ is the share of the decay of the nuclide j into the nuclide i;

$f_{ik}$ is the share of the nuclide k transformed into the nuclide i after absorption of neutrons; and $\Phi$ is the averaged neutron flux rate by position and energy, cm$^{-2}$s$^{-1}$.

The KORIGEN program is a KARLSRUHE version of the Oak Ridge National Laboratory (ORNL) isotope generation and depletion program ORIGEN, which is used to calculate the inventory of radionuclides (including the radioactivity of uranium and transuranic elements, and fission products) in the equilibrium core, based on the point-depletion burnup model described above. It should be noted that both the calculation of the inventory for radionuclides (including the radioactivity of the uranium and transuranic elements, and fission products) in the equilibrium core of HTR-10 and a high-temperature gas-cooled reactor pebble-bed module(HTR-PM) can be made using the KORIGEN program. In addition, the more simplified IPRFGN model can also be used to calculate the inventory of the short-lived noble fission gas nuclide.

S12, obtaining a ratio $R/B_i$ of a release rate to a birth rate of the short-lived noble fission gas nuclide based on temperature information of the fuel elements in the core using a Booth diffusion and release model.

In another embodiment of this specification, the type of the fuel elements in this calculation method is the TRISO or BISO (Bistructural ISOtropic) coated particles. The calculation method will now be described below taking the TRISO coated particles in the fuel elements as an example.

The diffusion and release calculations for the gas fission nuclide are more simplified than the diffusion and release calculations for the solid fission nuclide, so the diffusion and release of the gas fission nuclide can be seen as a simplified case of the diffusion and release calculations of the solid fission nuclide. The gas fission nuclide generally has a shorter half-life and reaches equilibrium more quickly than that of the solid fission nuclide. Therefore, the gas fission nuclide can be considered to reach equilibrium, at the time scale considered for the diffusion and release calculation of fission nuclides in the reactor. In addition, since the SiC layer has strong retention ability for gas fission nuclides, it is assumed that fission products in the intact TRISO fuel coated particles cannot diffuse into the void of the matrix graphite of the fuel elements.

Figure 3:
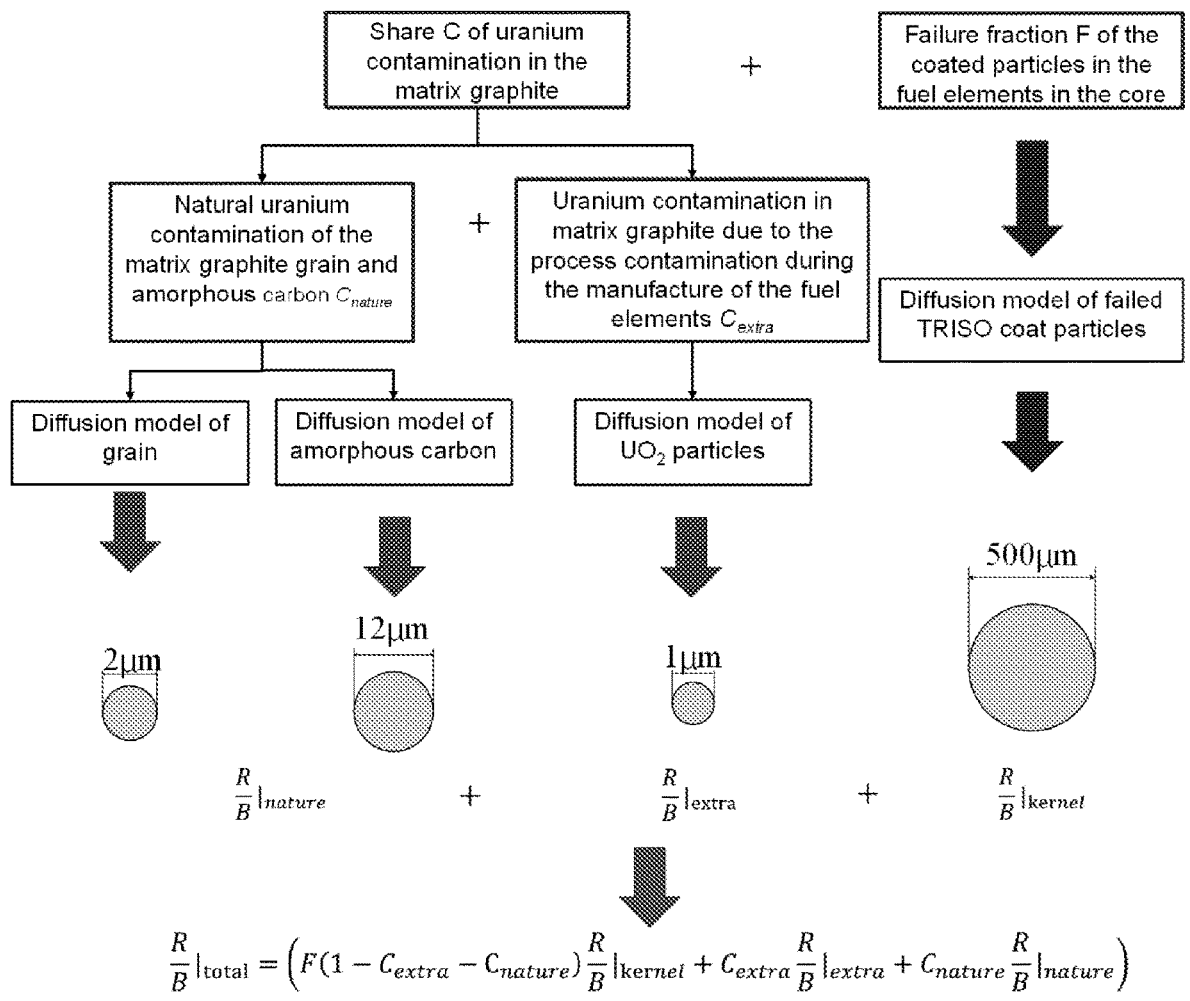
FIG. 3 is the schematic diagram of the determination of the diffusion of the short-lived noble gas fission nuclide.

The principle of the Booth model for the diffuse and release of the gas fission nuclide is shown in FIG. 3. When calculating the diffuse and release of the gas fission nuclide, the uranium-containing fractions in the fuel elements that can produce and release the short-lived noble gas fission nuclide into the primary circuit includes four categories: the failed TRISO coated particles, UO$_2$ particles in the matrix graphite, matrix graphite grain, and amorphous carbon. Since the failure of the TRISO coated particles is considered to be randomly located, the radionuclides released into the void of matrix graphite of the fuel elements remain uniformly distributed from the failed coated particles and the grains in the matrix graphite. The voids in the matrix graphite of the fuel elements are thought to be in connection with the primary helium coolant and have no retention of the noble gas fission nuclides. Since the four diffusion models (i.e., the diffusion model for the nuclide in the amorphous carbon, grain, UO$_2$ particles and failed TRISO coat particles) in FIG. 3 are all without outer cladding, the diffusion differential equations are greatly simplified for settlement.

Thus, all four diffusion models used for the diffusion and release calculations of the noble gas fission nuclide can be described by the Booth model:

$$\begin{cases} 0 = D\left(\dfrac{\partial^2 c}{\partial r^2} + \dfrac{2}{r}\dfrac{\partial c}{\partial r}\right) - \lambda c + B & \text{(2)} \\ \dfrac{\partial c}{\partial t}\Big|_{r=0} = 0 & t > 0 \\ c(r = a, t) = 0 & t > 0 \\ c(r, t = 0) = 0 & 0 \le r \le a \end{cases}$$

where:
a is the radius of the equivalent sphere, cm;
c is the atom number of a nuclide per unit volume, i.e. the nuclide concentration, $cm^{-3}$;
B is the number of atoms produced per unit volume, i.e. the birth rate per unit volume, $cm^{-3}s^{-1}$;
D is the diffusion coefficient of the nuclide, $cm^2/s$;
t is the diffusion time of the nuclide, s;
r is the distance away from the center of the sphere, cm; and
$\lambda$ is the decay constant of the nuclide, $s^{-1}$.

The analytical solution of this Booth model is $$\frac{R}{B} = 3\sqrt{\frac{D}{\lambda a^2}}\left(\coth\left(\sqrt{\frac{\lambda a^2}{D}}\right) - \sqrt{\frac{D}{\lambda a^2}}\right) \quad (3)$$

where:
R/B is the ratio of the release rate to the birth rate of a nuclide in the equivalent sphere;
in equation $D'=D/a^2$, D' is the reduced diffusion coefficient of a nuclide, which can be expressed using the Arrhenius formula:

$$D' = D'_0 e^{-\frac{Q}{RT}} \quad (4)$$

where:
$D_0'$ is the frequency factor, $s^{-1}$;
Q is the activation energy, J/mol;
R is the ideal gas constant, J/(mol·K); and
T is the average temperature of the material in which the nuclide diffuses, K.

Considering different burnup effects and parent nucleus assisted diffusion, the corrected formula for the ratio of the release rate to the birth rate in formula (3) is:

$$\frac{R}{B} = 3\left(\frac{1}{\Gamma_1}\left(\frac{\coth\sqrt{\mu_1}}{\sqrt{\mu_1}} - \frac{1}{\mu_1}\right) + \frac{1}{\Gamma_2}\left(\frac{\coth\sqrt{\mu_2}}{\sqrt{\mu_2}} - \frac{1}{\mu_2}\right)\right) f_{BU} \quad (5)$$

$$\Gamma_1 = 1 - \frac{\mu_1}{\mu_2}, \Gamma_2 = 1 - \frac{\mu_2}{\mu_1}, \mu_1 = \frac{\lambda_1}{D'_1}, \mu_2 = \frac{\lambda_2}{D'_2} \quad (6)$$

where:
$f_{BU}$ is the fuel burnup correction factor, % FIMA;
$\Gamma_1$, $\Gamma_2$ and $\mu_1$, $\mu_2$ are the defined calculation parameters;
$D'_1$, $D'_2$ are the reduced diffusion coefficients, $s^{-1}$; and
the subscripts 1, 2 denote the corresponding nuclide and parent nuclei of the nuclide respectively.

As shown in FIG. 3, the failure fraction of the coated particles in fuel elements of the pebble-bed high-temperature gas-cooled reactor is defined as F; uranium contamination in the matrix graphite in the fuel elements is defined as C, uranium contamination in matrix graphite due to the process contamination during the manufacture of the fuel elements is defined as $C_{extra}$, natural uranium contamination of the matrix graphite grain and amorphous carbon is defined as $C_{natrue}$, so an uranium fraction in the TRISO coated particles of all the fuel elements is $(1-C_{extra}-C_{natrue})$. An uranium fraction in the failed TRISO coated particles in which the short-lived noble gas fission nuclide diffuse is $F\times(1-C_{extra}-C_{natrue})$, so that the equivalent ratio of the release rate to the birth rate of the short-lived noble gas fission nuclide in all the fuel elements in the core is:

$$\frac{R}{B}\Big|_{total} = \quad (7)$$

$$\left(F(1 - C_{extra} - C_{natrue})\frac{R}{B}\Big|_{kernel} + C_{extra}\frac{R}{B}\Big|_{extra} + C_{natrue}\frac{R}{B}\Big|_{natrue}\right)$$

where:

$\dfrac{R}{B}\Big|_{total}$ is the equivalent ratio of the release rate to the birth rate of the short-lived noble gas fission nuclide in all the fuel elements in the core, (it should be noted that $\dfrac{R}{B}\Big|_{total}$ is the same parameter as $R/B_i$ in the previous section);

$\dfrac{R}{B}\Big|_{kernel}$ is the equivalent ratio of the release rate to the birth rate of the short-lived noble gas fission nuclide in the failed TRISO coated particles in the fuel elements in the core;

$\dfrac{R}{B}\Big|_{extra}$ is the equivalent ratio of the release rate to the birth rate of the short-lived noble gas fission nuclide from the uranium contamination in matrix graphite due to the process contamination during the manufacture of the fuel elements;

$\dfrac{R}{B}\Big|_{natrue}$ is the equivalent ratio of the release rate to the birth rate of the short-lived noble gas fission nuclide from natural uranium contamination in the fuel elements in the core;

$$\frac{R}{B}\Big|_{natrue} = 0.9998\left(0.995\frac{R}{B}\Big|_{grain} + 0.005\frac{R}{B}\Big|_{amorphous}\right) + 0.0002 \quad (8)$$

where:

$$\left.\frac{R}{B}\right|_{grain}$$

is the equivalent ratio of the release rate to the birth rate of the short-lived noble gas fission nuclide in the matrix graphite grain in the fuel elements; and $$\left.\frac{R}{B}\right|_{amorphous}$$

is the equivalent ratio of the release rate to the birth rate of the short-lived noble gas fission nuclide in the amorphous carbon in the fuel elements.

When calculating the equivalent ratio of the release rate to the birth rate of the short-lived noble gas fission nuclide in the failed TRISO coated particles, $UO_2$ particles in the matrix graphite, matrix graphite grain and amorphous carbon in the fuel elements in the core, the temperature distribution of the fuel elements needs to be taken into account, which can be provided by VSOP. For example, in the calculation process of the transition core of HTR-10, the temperature of the failed TRISO coated particles and the $UO_2$ particles in the matrix graphite can be estimated as the average temperature of the fuel elements, and the temperature of the matrix graphite grain and amorphous carbon can be estimated as the average temperature of the graphite sphere. The specific formula are:

$$\left.\frac{R}{B}\right|_{kernel} = \sum_i f_{k,T_i} \left.\frac{R}{B}\right|_{kernel,T_i} \tag{9}$$

$$\left.\frac{R}{B}\right|_{extra} = \sum_i f_{k,T_i} \left.\frac{R}{B}\right|_{extra,T_i} \tag{10}$$

$$\left.\frac{R}{B}\right|_{grain} = \sum_i f_{c,T_i} \left.\frac{R}{B}\right|_{grain,T_i} \tag{11}$$

$$\left.\frac{R}{B}\right|_{amorphous} = \sum_i f_{c,T_i} \left.\frac{R}{B}\right|_{amorphous,T_i} \tag{12}$$

where, $$\left.\frac{R}{B}\right|_{kernel,T_i}, \left.\frac{R}{B}\right|_{extra,T_i}, \left.\frac{R}{B}\right|_{grain,T_i}, \text{ and } \left.\frac{R}{B}\right|_{amorphous,T_i}$$

are the equivalent ratios of the release rate to the birth rate of the short-lived noble gas fission nuclide at the temperatures $T_i$ corresponding to the failed TRISO coated particles, $UO_2$ particles in the matrix graphite, matrix graphite grain, and amorphous carbon in the fuel elements in the core, respectively;

$f_{c,T_i}$ is the fraction of the matrix graphite in the core with the temperature of $T_i$; and $f_{k,T_i}$ is the fraction of the fraction of the failed TRISO coated particles in the fuel elements with the temperature of $T_i$.

S13, deriving a theoretical expression $A_i(F,C)$ for an activity concentration of the short-lived noble gas fission nuclide in a primary circuit using a migration model of the nuclide in the primary circuit.

As the helium cycle time is much less than the migration time of the noble gas fission nuclide in the primary circuit, the primary circuit helium can be considered as a whole with the uniform distribution of the radionuclide inside. The migration equation of the short-lived noble gas fission nuclide in the primary circuit is shown below:

$$\begin{cases} \frac{dC(t)}{dL} = \frac{R}{\lambda V} - \tau C(t) \\ C(0) = 0 \\ \tau = \lambda + \epsilon \frac{Q_\epsilon}{V} + \frac{\delta}{T} + \omega + \sigma_a \phi \frac{t_v}{T} \end{cases} \tag{13}$$

and the solution of the equation (13) is:

$$\begin{cases} C(t) = \frac{R}{\lambda V \tau}(1 - e^{-\tau t}) \\ A(t) = \lambda C(t) = \frac{R}{V \tau}(1 - e^{-\tau t}) \end{cases} \tag{14}$$

where

C is the atom concentration of a nuclide in helium coolant in the primary circuit, $cm^{-3}$;

A is the theoretical expression of the activity concentration of a nuclide in helium coolant in the primary circuit, Bq/L;

R is the release rate of a nuclide from the reactor core, Bq/s;

$\lambda$ is the decay constant of a nuclide, $s^{-1}$;

$\epsilon$ is the purification coefficient of a nuclide;

Q is the purification flow rate of the helium purification system, $cm^3/s$;

V is the total volume of helium in the primary circuit, L;

$\delta$ is the deposition coefficient of a nuclide per cycle;

T is the duration time per helium cycle, s;

$\omega$ is the leakage rate of helium in the primary circuit, $s^{-1}$;

$\sigma_a$ is the neutron absorption cross section of a nuclide, $cm^2$;

$\Phi$ is the core effective neutron flux, $cm^{-2}s^{-1}$;

$t_v$ is the duration time for the helium across the core per cycle, s; and $\tau$ is the equivalent removal rate, $s^{-1}$.

For the short-lived radionuclide, especially the short-lived noble gas fission nuclide, it can be considered that the equilibrium state is reached generally. Therefore, the activity concentration of the short-lived noble gas fission nuclide in the primary circuit can be simply expressed as $$A(t) = \frac{R}{V\tau} \tag{15}$$

where,

A is the theoretical expression of the activity concentration, Bq/L;

R is the release rate of a nuclide from the core, Bq/s;

V is the total volume of helium in the primary circuit, L; and $\tau$ is the equivalent removal rate, $s^{-1}$.

It should be noted that the parameter A(t) in formula (14) and (15) is the same as the parameter $A_i(F, C)$.

S14, obtaining an experimental measurement value $a_i$ of the activity concentration of the short-lived noble gas fission nuclide in the primary circuit at a sampling moment by measuring gas in a helium purification system in the primary circuit.

The helium purification system of the HTR-10 is directly connected to the primary circuit to maintain the purity of the helium coolant, and to control the concentration of radionuclides and the level of impurities in the helium. The impurities include various harmful gases ($H_2O$, $O_2$, $CO_2$, CO, $H_2$, $CH_4$, and $N_2$ etc.), solid particles dominated by graphite dust, and the radionuclides which are mainly isotopes of Kr and Xe, $^{14}C$, and $^{3}H$ etc. The helium purification system consists of a normal purification line and an accidental purification line. The normal purification line has a helium flow rate of approximately 65 $Nm^3/h$, i.e. the amount of helium flowing through the helium purification system per hour is approximately 5% of the total helium inventory in the core. After the helium coolant in the primary circuit flows through the helium purification system, the activity of the fission nuclide such as Kr and Xe in the helium coolant is decreased by approximately 2 to 3 orders of magnitude.

Figure 4A:
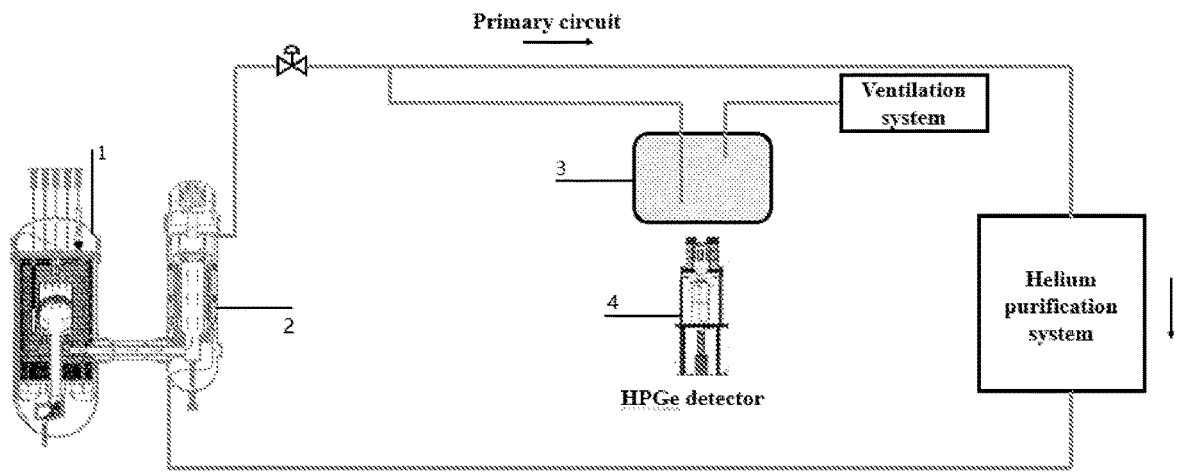
FIG. 4A is the schematic diagram of the continuous on-line measurement system for the short-lived noble gas fission nuclide in the 10 MW pebble-bed high-temperature gas-cooled experiment reactor(HTR-10).
Figure 4B:
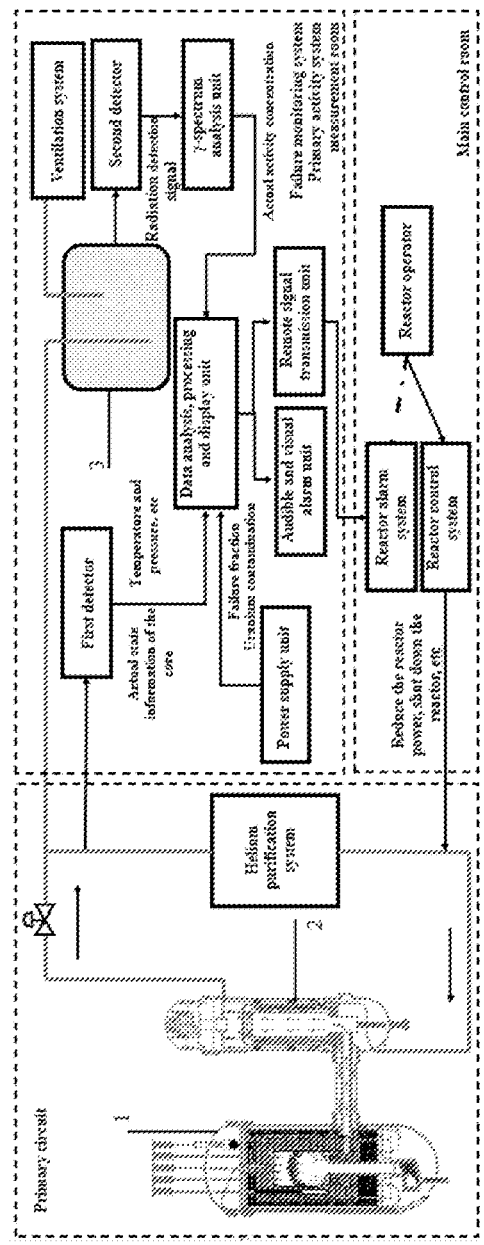
FIG. 4B is the schematic diagram of the system for monitoring failure of coated particles in fuel elements in a core of a pebble-bed high-temperature gas-cooled reactor.

FIG. 4A and FIG. 4B show the schematic diagram of the continuous on-line measurement system for the short-lived noble gas fission nuclide in HTR-10 and the schematic diagram of the system for monitoring failure of coated particles in fuel elements in a core of a pebble-bed high-temperature gas-cooled reactor, respectively. The gas in the primary circuit enters a helium purification system. At the inlet of the helium purification system, a portion of the gas from the primary circuit enters the experimental loop and is stored in a sample tank 3. And a γ spectrum is obtained by measuring the gas in the sample tank via a HPGe detector 4. After the energy scale and efficiency scale calibration with the γ spectrum, the nuclides are identified and the nuclide's activities are determined. The experimental measurement value $a_i$ of the activity concentration of the short-lived noble gas fission nuclide in the primary circuit at the sampling moment is derived after correction of the sampling time period on the basis of the nuclide and its activity. After measurement, the sample tank is emptied directly and then discharged to the environment after the treatment by a ventilation system. The experimental loop is set at the inlet of the helium purification system in the primary circuit. The extracted gas has not been purified by the helium purification system, so that it can be considered as the direct gas sampling from the primary circuit.

S15, optimally calculating a failure fraction F of the coated particles in the fuel elements in the core and a share C of uranium contamination in a matrix graphite using a least squares method based on the theoretical expression $A_i(F,C)$ and the experimental measurement value $a_i$. Specifically, the optimization equation used for the least squares method is as follows:

$$S=\Sigma_{i=1}^{n}(A_i-a_i)^2 \quad (16)$$

where:
S is the optimization function and the optimization objective is to get the minimum S value;
n is the total number of the short-lived noble gas fission nuclide i considered;
$a_i$ is the experimental measurement value of the activity concentration of the short-lived noble gas fission nuclide i in the primary circuit, Bq/L;
$A_i$ is the theoretical expression of activity concentration for the short-lived noble fission gas nuclide i in the primary circuit, Bq/L;

$$A_i = \frac{(\lambda_i I_i)\frac{R}{B}\big|_i}{V\tau_i} \quad (17)$$

where:
$\lambda_i$ is the decay constant of the short-lived noble gas fission nuclide i, $s^{-1}$;
$I_i$ is the inventory of the short-lived noble gas fission nuclide i, Bq;
$\tau_i$ is the equivalent removal rate of the nuclide i, $s^{-1}$; and $$\frac{R}{B}\big|_i$$

is the ratio of the release rate to the birth rate of nuclide i.

According to an embodiment of the present disclosure, it also includes:

S16, maintaining a current operating state of the pebble-bed high-temperature gas-cooled reactor when the failure fraction F of the coated particles in the fuel elements in the core is less than a first preset value; adjusting operating parameters of the pebble-bed high-temperature gas-cooled reactor when the failure fraction F of the coated particles in the fuel elements in the core is larger than or equal to the first preset value and less than a second preset value, so that the failure fraction F of the coated particles in the fuel elements in the core is reduced to less than the first preset value; initiating a shutdown procedure of the pebble-bed high-temperature gas-cooled reactor when the failure fraction F of the coated particles in the fuel elements in the core is larger than or equal to the second preset value for more than a preset duration.

It is to be noted that the first preset value may be for example $1e^{-4}$, and the second preset value may be for example $5e^{-4}$. Meanwhile, when the F is less than the first preset value, the alarm instrument is controlled for displaying the first color and/or for making the first sound; when the F is larger than or equal to the first preset value and less than the second preset value, the alarm instrument is controlled for displaying the second color and/or for making the second sound; when the F is larger than or equal to the second preset value, the alarm instrument is controlled for displaying the third color and/or for making the third sound; when the F is larger than or equal to the second preset value for more than the preset time, the alarm instrument is controlled for displaying the fourth color and/or for making the fourth sound. The first color, the second color, the third color and the fourth color are different. The first sound, the second sound, the third sound and the fourth sound are different.

For example, when the alarm instrument displays the second color and/or makes the second sound, the operators can identify the cause of the abnormally high level of the radioactivity in the primary circuit and the increase in the failure fraction of the coated particles in the fuel elements in the core (whether the temperature and flow rate of the primary helium at the core outlet and inlet, reactor power and other parameters are in normal state or not), and then the operators can recover the radioactivity level in the primary circuit and the failure faction of the coated particle in the fuel elements in the core to the normal level (F less than the first preset value) by means of the decrease in reactor operating power, for example, through interaction between the user terminal and the processor. When the alarm instrument displays the third color and/or makes the third sound, the operators should decrease the radioactivity level in the primary circuit and the failure fraction of the coated particles in the fuel elements in the core within the required time, making the F less than the second preset value through interaction between the user terminal and the processor. When the alarm instrument displays the fourth color and/or makes the fourth sound, the operators should start the shutdown operation immediately through interaction between the user terminal and the processor.

As shown in FIG. 4B, the dashed box on the left shows the core and primary circuit of the pebble-bed high-temperature gas-cooled reactor; the upper dashed box on the right shows a system for monitoring the failure of the coated particles in fuel elements in the core of the pebble-bed high-temperature gas-cooled reactor (denoted as failure monitoring system for simplification), which located in the primary activity system measurement room usually; the lower dashed box on the right shows the main control room, in which the core information determined by a system for monitoring the failure of the coated particles in the fuel elements in the core of the pebble-bed high-temperature gas-cooled reactor (mainly the values of F and C, and activity concentration of radionuclides in the primary circuit, etc.) and the corresponding information about the core diagnostic and adjustment operations are received, and interacting with the reactor operator to ensure the safe operation of the pebble-bed high-temperature gas-cooled reactor.

The failure monitoring system includes the detectors and the processors. The detectors include the first detector and the second detector, while the processors comprise the γ spectrum analysis unit, the data analysis, processing and display unit and audible and the visual alarm unit. The processors can also include, for example, the power supply unit and the remote signal transmission unit. The power supply unit can supply power to the data analysis, processing and display unit. The first detector obtains the actual state information of the core (e.g. the temperature and pressure of helium in the core and primary circuit, etc.) by continuous measurement and transmits the actual state information to the data analysis, processing and display unit; the second detector measures the γ-rays of radionuclides in the primary circuit helium in the sampling and measurement loop and transmits the radiation detection signal to the γ-spectrum analysis unit. After performing the spectral calibration, nuclide identification and other operations, the γ-spectrum analysis unit can derive the actual activity concentration of the typical radionuclides (including the isotopes of Kr and Xe) in the primary helium, and then transmit the actual activity concentration to the data analysis, processing and display unit. The data analysis, processing and display unit combines the information from the first detector and the second detector to determine the values of F of the coated particles and C in the fuel elements in the core according to the method in the embodiments of this disclosure, and to make alarm judgements and implement corresponding adjustment and operational measures for the reactor. The audible and visual alarm unit can send out local sound and light alarm when F of the coated particles in the fuel elements in the core exceeds the preset value. The remote signal transmission unit remotely transmits (hard-wired and RS485 communication mode) the actual state information of the core (including the actual activity concentration of radionuclides in the primary circuit, the temperature and pressure of the helium in the core and primary circuit, etc.), the values of F of the coated particles and C in the fuel elements in the core, the core status diagnosis of the reactor (including the alarm judgement) and the corresponding measures for adjusting and operating the reactor, to the reactor alarm system in the main control room and also may be displayed on the screen of the main control room. If the values of F of the coated particles in the fuel elements in the core exceeds a preset value, the reactor alarm system will provide a sound and light alarm in the main control room and be highlighted on the screen of the main control room (flashing, etc.), and will also display the actual state information of the core and the corresponding measures for adjusting and operating the reactor. Accordingly, the reactor operator shall adjust and operate the reactor through the reactor control system to reduce the reactor power, shut down the reactor, etc.

In another embodiment of the present disclosure, the numerical determination of the share C of uranium contamination in matrix graphite can be performed before the numerical determination of F. When C is determined to be stable, the numerical determination of F is then performed by performing procedure S16.

The calculation process of the method described in this disclosure is further illustrated below, and take HTR-10 as an example.

1. Determining the inventory $I_i$ of the short-lived noble gas fission nuclide in the reactor using the IPRFGN model According to the actual state information of the reactor core of HTR-10 during operation in Table 2 (include, for example, operating power, neutron flux, temperature and pressure), the neutron spectrum provided by the VSOP and the fuel temperature information provided by the VSOP are determined. And then the neutron spectrum and the fuel temperature information and the real state information of the reactor are input into the IPRFGN model to derive the inventory $I_i$ for the short-lived noble gas fission nuclides $^{85m}$Kr, $^{87}$Kr and $^{88}$Kr, as shown in Table 3.

TABLE 2

The actual state information of the reactor core of HTR-10 during operation

| Time | Operating Power (MW) | Number of the fuel elements | Reactor reduced power in the final stage $P_{final}$ (MW/tU) | Average burnup of the fuel elements B (GWd/tU) |
|---|---|---|---|---|
| A/B/C-D/E/F | 9.86 | 14018 | 140.68 | 9.35 |

TABLE 3

The inventory of the short-lived noble gas fission nuclide in HTR-10 during operation

| Nuclide | Half-life | Decay constant λ (s$^{-1}$) | Inventory $I_i$ (Bq) |
|---|---|---|---|
| $^{85m}$Kr | 4.48 h | $4.30 \times 10^{-5}$ | $5.25 \times 10^{16}$ |
| $^{87}$Kr | 76.3 min | $1.51 \times 10^{-4}$ | $1.09 \times 10^{17}$ |
| $^{88}$Kr | 2.84 h | $6.78 \times 10^{-5}$ | $1.60 \times 10^{17}$ |

2. Obtaining the ratio of the release rate to the birth rate $R/B_i$ ($R/B_i$ is equivalent to $$\left.\frac{R}{B}\right|_{total}$$

in the preceding text) of the short-lived noble gas fission nuclide basing on the temperature of the fuel elements using the Booth diffusion and release model.

The fractions of the fuel elements and graphite spheres at different temperatures for the HTR-10 operating at 10 MW are shown in Table 4.

TABLE 4

The fractions of the fuel elements and graphite spheres at different temperatures for the HTR-10 operating at 10 MW

| Average temperature of the fuel elements (° C.) | Fraction of the fuel elements | Average temperature of graphite spheres (° C.) | Fraction of graphite spheres |
|---|---|---|---|
| 338.96 | 0.032 | 341.42 | 0.063 |
| 375.47 | 0.067 | 375.25 | 0.063 |
| 411.98 | 0.051 | 409.08 | 0.025 |
| 448.49 | 0.031 | 442.91 | 0.038 |
| 485.01 | 0.056 | 476.74 | 0.031 |
| 521.52 | 0.035 | 510.57 | 0.044 |
| 558.03 | 0.050 | 544.40 | 0.031 |
| 594.54 | 0.041 | 578.23 | 0.038 |
| 631.06 | 0.056 | 612.07 | 0.044 |
| 667.57 | 0.050 | 645.90 | 0.056 |
| 704.08 | 0.064 | 679.73 | 0.081 |
| 740.59 | 0.089 | 713.56 | 0.031 |
| 777.11 | 0.108 | 747.39 | 0.119 |
| 813.62 | 0.169 | 781.22 | 0.113 |
| 850.13 | 0.068 | 815.05 | 0.163 |
| 886.64 | 0.032 | 848.88 | 0.063 |

Note:
The data in Table 4 is derived from the results of the VSOP.

TABLE 5

Parameters related to the diffusion coefficient of each nuclide during diffusion

| Nuclide | $D_{0k}'[s^{-1}]$ | $Q_k[J/mol]$ | $D_{0g}'[s^{-1}]$ | $Q_g[J/mol]$ | $D_{0a}'[s^{-1}]$ | $Q_a[J/mol]$ |
|---|---|---|---|---|---|---|
| $^{85m}Kr$ | $2.08 \times 10^{-5}$ | $1.26 \times 10^5$ | $3.04 \times 10^{-5}$ | $1.06 \times 10^5$ | $1.70 \times 10^{-2}$ | $5.40 \times 10^4$ |
| $^{87}Kr$ | $2.08 \times 10^{-5}$ | $1.26 \times 10^5$ | $3.04 \times 10^{-5}$ | $1.06 \times 10^5$ | $1.70 \times 10^{-2}$ | $5.40 \times 10^4$ |
| $^{88}Kr$ | $2.08 \times 10^{-5}$ | $1.26 \times 10^5$ | $3.04 \times 10^{-5}$ | $1.06 \times 10^5$ | $1.70 \times 10^{-2}$ | $5.40 \times 10^4$ |

In Table 5, $D_{0k}'$, $D_{0g}'$, and $D_{0a}'$ are the frequency factors of the diffusion coefficient of the nuclide in the failed TRISO coated particles in the fuel elements, matrix graphite grain and amorphous carbon, respectively; $Q_k$, $Q_g$, and $Q_a$ are activation energies of the diffusion coefficient of the nuclide in the failed TRISO coated particles in the fuel elements, matrix graphite grain and amorphous carbon, respectively.

According to equations (3)-(12), the total equivalent ratios of the release rate to the birth rate of each short-lived noble gas fission nuclide is obtained and is shown in Table 6.

TABLE 6

Equivalent ratio of the release rate to the birth rate of the short-lived noble gas fission nuclide in all the fuel elements in the core

| Nuclide | $\frac{R}{B}\|_i$ |
|---|---|
| $^{85m}Kr$ | $8.31 \times 10^{-7}$ |
| $^{87}Kr$ | $4.45 \times 10^{-7}$ |
| $^{88}Kr$ | $6.63 \times 10^{-7}$ |

3. Deriving the theoretical expression $A_i(F,C)$ for the activity concentration of the short-lived noble gas fission nuclide in the primary circuit using the migration model of the nuclide in the primary circuit Based on the parameters of the primary circuit of HTR-10 during operation, the cycle time T of the short-lived noble gas fission nuclide along with the helium, the duration time $t_v$ for the helium across the core per cycle, and the core effective neutron flux $\Phi$ can be calculated. The equivalent removal rate $\tau$ for the short-lived noble gas fission nuclide in the primary circuit is then calculated according to the equation (13) to determine the theoretical expression $A_i(F,C)$ for the activity concentration of the short-lived noble gas fission nuclide in the primary circuit.

TABLE 7

Actual operation parameters of the primary circuit of HTR-10

| Parameter of the primary circuit | Value of parameter in the primary circuit |
|---|---|
| Core power $P_t$ | 9.86 MW |
| Temperature at the core inlet $T_{in}$ | 234.24° C. |
| Temperature at the core outlet $T_{out}$ | 664.02° C. |
| Pressure of primary helium in the primary circuit $P_{He}$ | 2.62 MPa |
| Flow rate of primary helium in the primary circuit Q | 4.15 kg/s |
| Density of primary helium in the primary circuit $\rho_{He}$ | 1.74 kg/m$^3$ |
| Total volume of primary helium in the primary circuit V | 85.4 m$^3$ |
| Helium flow rate in helium purification system $Q_{He}$ | 1186 cm$^3$/s |

TABLE 7-continued

Actual operation parameters of the primary circuit of HTR-10

| Parameter of the primary circuit | Value of parameter in the primary circuit |
|---|---|
| Thermal neutron flux in region 1 of the core $\Phi_{1, therm}$ | $2.53 \times 10^{13}$ cm$^{-2}$s$^{-1}$ |
| Fast neutron flux in region 1 of the core $\Phi_{1, fast}$ | $1.10 \times 10^{13}$ cm$^{-2}$s$^{-1}$ |
| Thermal neutron flux in region 2 of the core $\Phi_{2, therm}$ | $3.17 \times 10^{13}$ cm$^{-2}$s$^{-1}$ |
| Fast neutron flux in region 2 of the core $\Phi_{2, fast}$ | $1.43 \times 10^{13}$ cm$^{-2}$s$^{-1}$ |
| Thermal neutron flux in region 3 of the core $\Phi_{3, therm}$ | $3.13 \times 10^{13}$ cm$^{-2}$s$^{-1}$ |
| Fast neutron flux in region 3 of the core $\Phi_{3, fast}$ | $1.25 \times 10^{13}$ cm$^{-2}$s$^{-1}$ |

TABLE 8

Empirical parameters used to calculate the equivalent removal rate for the primary circuit under actual operation of HTR-10

| Empirical parameter | Value of empirical parameter |
|---|---|
| Noble gas purification coefficient of the helium purification systems $\epsilon$ | 0.95 |

TABLE 8-continued

Empirical parameters used to calculate the equivalent removal rate for the primary circuit under actual operation of HTR-10

| Empirical parameter | Value of empirical parameter |
|---|---|
| Leakage rate $\omega$ | $5.79 \times 10^{-8}$ s$^{-1}$ |
| Deposition coefficient of noble gas $\delta$ | 0 |

TABLE 9

Equivalent removal rate of the short-lived noble gas fission nuclide for the primary circuit under actual operation of HTR-10

| Equivalent removal rate for the primary circuit | Calculated value (s$^{-1}$) |
|---|---|
| $\tau_{Kr-85m}$ | $5.62 \times 10^{-5}$ |
| $\tau_{Kr-87}$ | $1.65 \times 10^{-4}$ |
| $\tau_{Kr-88}$ | $8.10 \times 10^{-5}$ |

4. Through experimental measurements, the experimental measurement value $a_i$ of the activity concentration of the short-lived noble gas fission nuclide in the primary circuit at the sampling moment is obtained After correction, the results of the sampling measurements of the short-lived noble gas fission nuclide for HTR-10 are shown in Table 10.

TABLE 10

Experimental measurement value of the activity concentration of the short-lived noble gas fission nuclide in the primary circuit under actual operation of HTR-10

| Nuclide | Activity concentration (Bq/L) |
|---|---|
| $^{85m}$Kr | 6871.5 |
| $^{87}$Kr | 10301.9 |
| $^{88}$Kr | 14262.5 |

5. Optimally calculating the failure fraction F of the coated particles in the fuel elements in the core and the share C of uranium contamination in the matrix graphite Using the available data, the optimization functions obtained from optimization of equations (16) and (17) are fitted to obtain the failure fraction F of the coated particles in the fuel elements and the share C of uranium contamination in the matrix graphite of HTR-10, as shown in Table 11.

TABLE 11

Calculation of the failure fraction F of the coated particles in the fuel elements in the core and the share C of uranium contamination in the matrix graphite of HTR-10

| Experimental time | Operating power (MW) | Average fuel burnup (GWD/tU) | Failure fraction of the coated particles in the fuel elements | Share of uranium contamination in the matrix graphite |
|---|---|---|---|---|
| A/B/C-D/E/F | 9.86 | 9.35 | $3.99 \times 10^{-5}$ | $8.24 \times 10^{-6}$ |
| Design value | — | — | $8.00 \times 10^{-4}$ | — |

The present disclosure provides a method for calculating the failure fraction of the coated particles in fuel elements in the core of the pebble-bed high-temperature gas-cooled reactor, which monitors the failure fraction F of the coated particles in the fuel elements and the share C of uranium contamination in the matrix graphite in the core, according to the activity concentration of the short-lived noble gas fission nuclide in the primary circuit. This method uses a simpler and faster method of calculating the inventory of the short-lived noble gas fission nuclide that also meets the accuracy requirements of engineering applications. Based on the diffusion and release model of the fission nuclides for the pebble-bed high-temperature gas-cooled reactor, the method uses the optimization algorithm considering three noble gas nuclides, $^{85m}$Kr, $^{87}$Kr and $^{88}$Kr jointly to determine the failure fraction of the coated particles in the fuel elements and the share of uranium contamination in the matrix graphite in the core. Meanwhile, the experimental system is calibrated with a sampling tank volume source, and the experimental measurement method of the activity concentration of the short-lived noble gas fission nuclide in the primary circuit and its uncertainty calculation are improved. The method provided by the present disclosure enables the key parameters of the performance and status of the fuel elements in the core, which are required in radiation safety studies, source term calculations, accident analysis, etc. of the pebble-bed high-temperature gas-cooled reactor, thus to promote the safety study, source term calculations, accident analysis, etc. and adjust the pebble-bed high-temperature gas-cooled reactor.

It should be noted that the embodiments in this disclosure can be performed using the computer devices or apparatus. Specifically, the computer devices or apparatus are in communication with the detector in the system for monitoring the failure of the coated particles in fuel elements in the core of the pebble-bed high-temperature gas-cooled reactors, as showed in FIG. 4B, to detect the actual state information of the pebble-bed high-temperature gas-cooled reactor, sample and measure the activity concentration of the short-lived noble gas fission nuclide, and determine the best estimates of the failure fraction of the coated particles in the fuel elements and the share of uranium contamination in the matrix graphite in the core, which can be used in safe alarms (audible and visual alarms) and/or adjustments of the pebble-bed high-temperature gas-cooled reactor.

A computer device may include one or more processing devices (processors), such as one or more central processing units (CPU), each of which may implement one or more hardware threads. The computer device may also include any memory for storing any kind of information, w such as codes, settings, data, etc. By way of non-limiting examples, the memory may include any one or more of the following: any type of RAM, any type of ROM, a flash memory device, a hard disk, an optical disk, etc. More generally, any storage resource may use any technology to store information. Further, any memory may provide a volatile or non-volatile retention of information. Further, any memory may represent a stationary or removable component of the computer device. In one embodiment, the computer device may perform any of the operations of the associated instructions when the processor device executes the associated instructions that are stored in any memory or combination of memory. The computing device also includes one or more drive mechanisms for interacting with any memory, such as a hard disk drive mechanism, an optical disk drive mechanism, etc.

The computer device may also include input/output modules (I/O) for receiving various inputs (via the input device) and for providing various outputs (via the output device). One particular output mechanism may include a presentation device and an associated graphical user interface (GUI). In other embodiments, the input/output module (I/O), the input device and the output device may also be excluded, as just one computer device in the network. The computer device may also include one or more network interfaces for exchanging data with other devices via one or more communication links. One or more communication buses couple the components described above together.

The communication link may be implemented in any manner, for example, over a local area network, a wide area network (e.g., the Internet), a point-to-point connection, etc., or any combination thereof. The communication links may include any combination of hardwired links, wireless links, routers, gateway functions, name servers, etc., governed by any protocol or combination of protocols.

The embodiment of the present disclosure further provides a computer-readable instructions, storing a computer program that implements the method described above when executed by the processor.

The embodiment of the present disclosure further provides a kind of computer program products including the computer program that implements the method described above when executed by the processor.

Those skilled in the art should understand that embodiments of this disclosure may be provided as methods, systems, or computer program products. Therefore, this disclosure may be implemented in the form of fully-hardware embodiments, fully-software embodiments, or combined software-hardware embodiments. In addition, this disclosure may employ the form of a computer program product implemented on one or more computer storage medium (including but not limited to disk memory, CD-ROM, and optical memory) containing computer programming code. The embodiments are merely examples of the present disclosure, which may also be implemented in other particular ways or in other particular forms without departing from the gist or essential features of the present disclosure. Accordingly, the described embodiments are to be regarded as illustrative and not limiting in any respect. The scope of the present disclosure shall be illustrated by the additional claims and any variations equivalent to the intent and scope of the claims shall also be included within the scope of the present disclosure.

What is claimed is:

1. A method for monitoring failure of coated particles in fuel elements in a core of a pebble-bed high-temperature gas-cooled reactor, comprising:
    S10, obtaining actual state information of a pebble-bed high-temperature gas-cooled reactor from the pebble-bed high-temperature gas-cooled reactor in operation;
    S11, determining an inventory $I_i$ of a short-lived noble gas fission nuclide in a nuclear fission reactor based on the actual state information of the pebble-bed high-temperature gas-cooled reactor;
    S12, obtaining a ratio $R/B_i$ of a release rate to a birth rate of the short-lived noble gas fission nuclide based on temperature information of the fuel elements in the core using a Booth diffusion and release model;
    S13, deriving a theoretical expression $A_i(F,C)$ for an activity concentration of the short-lived noble gas fission nuclide in a primary circuit using a migration model of the nuclide in the primary circuit;
    S14, sampling gas at an inlet of a helium purification system in the primary circuit of the pebble-bed high-temperature gas-cooled reactor for a sampling time period, and measuring the gas to obtain an experimental measurement value $a_i$ of the activity concentration of the short-lived noble gas fission nuclide in the primary circuit at a sampling moment;
    S15, optimally calculating a failure fraction F of the coated particles in the fuel elements in the core and a share C of uranium contamination in a matrix graphite in the core using a least square method based on the theoretical expression $A_i(F,C)$ for the activity concentration and the experimental measurement value $a_i$;
    S16, maintaining a current operating state of the pebble-bed high-temperature gas-cooled reactor when the failure fraction F of the coated particles in the fuel elements in the core is less than a first preset value; adjusting operating parameters of the pebble-bed high-temperature gas-cooled reactor when the failure fraction F of the coated particles in the fuel elements in the core is larger than or equal to the first preset value and less than a second preset value, so that the failure fraction F of the coated particles in the fuel elements in the core is reduced to less than the first preset value; initiating a shutdown procedure of the pebble-bed high-temperature gas-cooled reactor when the failure fraction F of the coated particles in the fuel elements in the core is larger than or equal to the second preset value for more than a preset duration.

2. The method according to claim 1, wherein in the step S11, the inventory $I_i$ is determined using a IPRFGN model or conventional point-depletion burnup equations, and the IPRFGN model is a simplification of the point-depletion burnup equations and describes cores of various types of nuclear fission reactors as a point reactor with several key parameters.

3. The method according to claim 1, wherein the Booth diffusion and release model in the step S12 is:

$$\begin{cases} 0 = D\left(\dfrac{\partial^2 c}{\partial r^2} + \dfrac{2}{r}\dfrac{\partial c}{\partial r}\right) - \lambda c + B \\ \left.\dfrac{\partial c}{\partial t}\right|_{t=0} = 0 \qquad t > 0 \\ c(r=a, t) = 0 \qquad t > 0 \\ c(r, t=0) = 0 \qquad 0 \le r \le a \end{cases}$$

where:
a is the radius of the equivalent sphere, cm;
c is the atom number of a nuclide per unit volume, i.e. the nuclide concentration, $cm^{-3}$;
B is the number of atoms produced per unit volume, i.e. the birth rate per unit volume, $cm^{-3}s^{-1}$;
D is the diffusion coefficient of a nuclide, $cm^2/s$;
t is the diffusion time of a nuclide, s;
r is the distance away from the center of the sphere, cm;
$\lambda$ is the decay constant of a nuclide, $s^{-1}$;
the analytical solution is:

$$\frac{R}{B} = 3\sqrt{\frac{D}{\lambda a^2}}\left(\coth\left(\sqrt{\frac{\lambda a^2}{D}}\right) - \sqrt{\frac{D}{\lambda a^2}}\right)$$

where:
R/B is the ratio of the release rate to the birth rate of a nuclide in the equivalent sphere;
in $D'=D/a^2$, D' is the reduced diffusion coefficient of a nuclide, which can be expressed using the Arrhenius formula:

$$D' = D'_0 e^{-\frac{Q}{RT}}$$

where:
$D_0'$ is the frequency factor, s$^{-1}$;
Q is the activation energy, J/mol;
R is the ideal gas constant, J/(mol·K);
T is the average temperature of the material in which the nuclide diffuses, K,
considering different burnup effects and parent nucleus assisted diffusion, the corrected formula for the ratio of the release rate to the birth rate is:

$$\frac{R}{B} = 3\left(\frac{1}{\Gamma_1}\left(\frac{\coth\sqrt{\mu_1}}{\sqrt{\mu_1}} - \frac{1}{\mu_1}\right) + \frac{1}{\Gamma_2}\left(\frac{\coth\sqrt{\mu_2}}{\sqrt{\mu_2}} - \frac{1}{\mu_2}\right)\right) f_{BU}$$

$$\Gamma_1 = 1 - \frac{\mu_1}{\mu_2}, \Gamma_2 = 1 - \frac{\mu_2}{\mu_1}, \mu_1 = \frac{\lambda_1}{D'_1}, \mu_2 = \frac{\lambda_2}{D'_2}$$

where:
$f_{BU}$ is the fuel burnup correction coefficient, % FIMA;
$\Gamma_1$, $\Gamma_2$ and $\mu_1$, $\mu_2$ are the defined calculation parameters;
$D'_1$, $D'_2$ are the reduced diffusion coefficients, s$^{-1}$; and
the subscripts 1, 2 denote the nuclide considered and its parent nuclei, respectively.

4. The method according to claim 3, wherein in the step S12, the uranium-containing fractions of producing and releasing the short-lived noble gas fission nuclide into the primary circuit in the fuel elements comprise four categories: the failed coated particles, UO$_2$ particles in the matrix graphite, matrix graphite grain, and amorphous carbon; the failure fraction of the coated particles in the fuel elements in the core of the pebble-bed high-temperature gas-cooled reactor is F; the share of uranium contamination in the matrix graphite in the fuel elements in the core is C, wherein the share of uranium contamination in matrix graphite due to the process contamination during the manufacture of the fuel elements is $C_{extra}$, the natural uranium contamination of the matrix graphite grain and amorphous carbon is $C_{natrue}$, so an uranium fraction in the coated particles of all the fuel elements is (1–$C_{extra}$–$C_{natrue}$), and an uranium fraction in the failed coated particles in which the short-lived noble gas fission nuclide diffuse is F×(1–$C_{extra}$–$C_{natrue}$), so that the equivalent ratio of the release rate to the birth rate of the short-lived noble gas fission nuclide in all the fuel elements in the core is:

$$\frac{R}{B}\bigg|_{total} = \left(F(1 - C_{extra} - C_{nature})\frac{R}{B}\bigg|_{kernel} + C_{extra}\frac{R}{B}\bigg|_{extra} + C_{nature}\frac{R}{B}\bigg|_{nature}\right)$$

where:

$$\frac{R}{B}\bigg|_{total}$$

is the equivalent ratio of the release rate to the birth rate of the short-lived noble gas fission nuclide in all the fuel elements in the core;

$$\frac{R}{B}\bigg|_{kernel}$$

is the equivalent ratio of the release rate to the birth rate of the short-lived noble gas fission nuclide in the failed coated particles in the fuel elements in the core;

$$\frac{R}{B}\bigg|_{extra}$$

is the equivalent ratio of the release rate to the birth rate of the short-lived noble gas fission nuclide from the uranium contamination in matrix graphite due to the process contamination during the manufacture of the fuel elements;

$$\frac{R}{B}\bigg|_{natrue}$$

is the equivalent ratio of the release rate to the birth rate of the short-lived noble gas fission nuclide from natural uranium contamination in the fuel element in the core;

$$\frac{R}{B}\bigg|_{nature} = 0.9998\left(0.995\frac{R}{B}\bigg|_{grain} + 0.005\frac{R}{B}\bigg|_{amorphous}\right) + 0.0002$$

where:

$$\frac{R}{B}\bigg|_{grain}$$

is the equivalent ratio of the release rate to the birth rate of the short-lived noble gas fission nuclide in the matrix graphite grain in the fuel elements; and $$\frac{R}{B}\bigg|_{amorphous}$$

is me equivalent ratio of the release rate to the birth rate of the short-lived noble gas fission nuclide in the amorphous carbon in the fuel elements.

5. The method according to claim 4, wherein when calculating the equivalent ratio of the release rate to the birth rate of the short-lived noble gas fission nuclide in the failed coated particles, UO$_2$ particles in the matrix graphite, matrix graphite grain and amorphous carbon in the fuel elements in the core, the temperature distribution of the fuel elements needs to be taken into account, which can be calculated according to the following formula:

$$\frac{R}{B}\bigg|_{kernel} = \sum_i f_{k,T_i}\frac{R}{B}\bigg|_{kernel,T_i}$$

$$\frac{R}{B}\bigg|_{extra} = \sum_i f_{k,T_i}\frac{R}{B}\bigg|_{extra,T_i}$$

$$\frac{R}{B}\bigg|_{grain} = \sum_i f_{c,T_i}\frac{R}{B}\bigg|_{grain,T_i}$$

$$\frac{R}{B}\bigg|_{amorphous} = \sum_i f_{c,T_i}\frac{R}{B}\bigg|_{amorphous,T_i}$$

where, $\frac{R}{B}|_{kernel,T_i}$, $\frac{R}{B}|_{extra,T_i}$, $\frac{R}{B}|_{grain,T_i}$, and $\frac{R}{B}|_{amorphous,T_i}$ are the equivalent ratios of the release rate to the birth rate of the short-lived noble gas fission nuclide at the temperature $T_i$ corresponding to the failed coated particles, $UO_2$ particles in the matrix graphite, matrix graphite grain, and amorphous carbon in the fuel elements in the core, respectively;

$f_{c,T_i}$ is the fraction of the matrix graphite in the core with a temperature of $T_i$; and $f_{k,T_i}$ is the fraction of the failed coated particles in the fuel elements with the temperature of $T_i$.

6. The method according to claim 5, wherein in the step S13, the migration equation of the short-lived fission gas nuclide in the primary circuit is:

$$\begin{cases} \frac{dC(t)}{dt} = \frac{R}{\lambda V} - \tau C(t) \\ C(0) = 0 \\ \tau = \lambda + \epsilon \frac{Q_\epsilon}{V} + \frac{\delta}{T} + \omega + \sigma_a \phi \frac{t_v}{T} \end{cases}$$

the solution of the equation is:

$$\begin{cases} C(t) = \frac{R}{\lambda V \tau}(1 - e^{-\tau t}) \\ A(t) = \lambda C(t) = \frac{R}{V\tau}(1 - e^{-\tau t}) \end{cases}$$

where:

C is the atom concentration of a nuclide in helium coolant in the primary circuit, $cm^{-3}$;

A is the theoretical expression of the activity concentration of a nuclide in helium coolant in the primary circuit, Bq/L;

R is the release rate of a nuclide from the reactor core, Bq/s;

$\lambda$ is the decay constant of a nuclide, $s^{-1}$;

$\epsilon$ is the purification coefficient of a nuclide;

Q is the purification flow rate of the helium purification system, $cm^3/s$;

V is the total volume of helium in the primary circuit, L;

$\delta$ is the deposition coefficient of a nuclide per cycle;

T is the duration time per helium cycle, s;

$\omega$ is the leakage rate of helium in the primary circuit, $s^{-1}$;

$\sigma_a$ is the neutron absorption cross section of a nuclide, $cm^2$;

$\Phi$ is the core effective neutron flux, $cm^{-2}s^{-1}$;

$t_v$ is the duration time for the helium across the core per cycle, s; and $\tau$ is the equivalent removal rate, $s^{-1}$.

7. The method according to claim 6, wherein for the short-lived noble gas fission nuclide in the step S13, when reaching equilibrium, the theoretical expression of the activity concentration of the short-lived noble gas fission nuclide in the primary circuit is:

$$A(t) = \frac{R}{V\tau}$$

where, A is the theoretical expression of the activity concentration, Bq/L, R is the release rate of a nuclide from the core, Bq/s, V is the total volume of helium in the primary circuit, L, and $\tau$ is the equivalent removal rate, $s^{-1}$.

8. The method according to claim 1, wherein the specific steps of the experimental measurement in the step S14 are:

the helium purification system is connected to the primary circuit; a portion of the gas from the primary circuit enters the experimental loop at the inlet of the helium purification system and is stored in a sample tank; a $\gamma$ spectrum is obtained by measuring the gas with a HPGe detector;

after the energy scale and efficiency scale calibration with the $\gamma$ spectrum, the nuclides are identified and their activities are determined; finally, the experimental measurement value $a_i$ of the activity concentration of the short-lived noble gas fission nuclide in the primary circuit at the sampling moment is derived after correction of the sampling time period.

9. The method according to claim 8, wherein the optimization equation in the step S15 is:

$$S = \Sigma_{i=1}^n (A_i - a_i)^2$$

where:

S is the optimization function, and the optimization objective is to get the minimum S value;

n is the total number of the short-lived noble gas fission nuclide considered;

$a_i$ is the experimental measurement value of the activity concentration of the short-lived noble gas fission nuclide i in the primary circuit, Bq/L;

$A_i$ is the theoretical expression of activity concentration of the short-lived noble fission gas nuclide i in the primary circuit, Bq/L:

$$A_i = \frac{(\lambda_i I_i)\frac{R}{B}|_{total,i}}{V\tau_i}$$

where:

$\lambda_i$ is the decay constant of the short-lived noble gas fission nuclide i, $s^{-1}$;

$I_i$ is the inventory of the short-lived noble gas fission nuclide i, Bq;

V is the total volume of helium in the primary circuit, L; and $\tau$ is the equivalent removal rate, $s^{-1}$.

10. A method for monitoring failure of coated particles in fuel elements in a core of a pebble-bed high-temperature gas-cooled reactor, comprising:

obtaining an actual state information of a pebble-bed high-temperature gas-cooled reactor from the pebble-bed high-temperature gas-cooled reactor in operation;

determining an inventory $I_i$ of a short-lived noble gas fission nuclide based on the actual state information;

determining a ratio $R/B_i$ of a release rate to a birth rate of the short-lived fission gas nuclide based on a share of uranium contamination in the matrix graphite in the core, a failure fraction of the coated particles in the fuel elements, and the actual state information;

deriving a theoretical expression $A_i(F,C)$ of the activity concentration of the short-lived noble gas fission nuclide using a migration model of the nuclide in the primary circuit, the actual state information, the inventory and the ratio of the release rate to the birth rate;

obtaining an experimental measurement value $a_i$ of the activity concentration of the short-lived noble gas fission nuclide by sampling and measuring the gas at an inlet of a helium purification system;

determining a best estimate of the failure fraction F of the coated particles in the fuel elements in the core and a best estimate of the share C of uranium contamination in a matrix graphite in the core using a least square method based on the theoretical expression $A_i(F,C)$ for the activity concentration and the experimental measurement value $a_i$ of the activity concentration; and maintaining a current operating state of the pebble-bed high-temperature gas-cooled reactor when the failure fraction F of the coated particles in the fuel elements in the core is less than a first preset value; adjusting operating parameters of the pebble-bed high-temperature gas-cooled reactor when the failure fraction F of the coated particles in the fuel elements in the core is larger than or equal to the first preset value and less than a second preset value, so that the failure fraction F of the coated particles in the fuel elements in the core is reduced to less than the first preset value; initiating a shutdown procedure of the pebble-bed high-temperature gas-cooled reactor when the failure fraction F of the coated particles in the fuel elements in the core is larger than or equal to the second preset value for more than a preset duration.

11. The method according to claim 10, wherein determining the inventory $I_i$ of the short-lived noble gas fission nuclide based on the actual state information comprises:

determining the inventory $I_i$ by a IPRFGN model or point-depletion burnup equations calculation procedure, wherein the IPRFGN model is a simplification of the point-depletion burnup equations and describes cores of various types of nuclear fission reactors as a point reactor with several key parameters.

12. The method according to claim 10, wherein determining the ratio $R/B_i$ of the release rate to the birth rate of the short-lived fission gas nuclide based on a share of uranium contamination in the matrix graphite in the core, the failure fraction of the coated particles in the fuel elements, and the actual state information comprises:

determining the ratio of the release rate to the birth rate $R/B_i$ of the short-lived fission gas nuclide based on the Booth diffusion and release model, wherein the Booth diffusion and release model is established based on the share of uranium contamination in the matrix graphite in the core, the failure fraction of the coated particles in the fuel elements and the actual state information;

wherein the Booth diffusion and release model is:

$$\begin{cases} 0 = D\left(\dfrac{\partial^2 c}{\partial r^2} + \dfrac{2}{r}\dfrac{\partial c}{\partial r}\right) - \lambda c + B \\ \dfrac{\partial c}{\partial t}|_{r=0} = 0 & t > 0 \\ c(r = a, t) = 0 & t > 0 \\ c(r, t = 0) = 0 & 0 \le r \le a \end{cases}$$

where, a is the radius of the equivalent sphere, cm, c is the number of atoms of a nuclide per unit volume, i.e. the nuclide concentration, $cm^{-3}$, B is the number of atoms produced per unit volume, i.e. the birth rate per unit volume, $cm^{-3}s^{-1}$, D is the diffusion coefficient of a nuclide, $cm^2/s$, t is the diffusion time of a nuclide, s, r is the distance away from the center of the sphere, cm, $\lambda$ is the decay constant of a nuclide, $s^{-1}$, and the D is determined based on the actual state information.

13. The method according to claim 12, wherein a formula for determining the ratio of the release rate to the birth rate is:

$$\frac{R}{B} = 3\sqrt{\frac{D}{\lambda a^2}}\left(\coth\left(\sqrt{\frac{\lambda a^2}{D}}\right) - \sqrt{\frac{D}{\lambda a^2}}\right)$$

where:

R/B is the ratio of the release rate to the birth rate, D is the diffusion coefficient of a nuclide, $cm^2/s$, $\lambda$ is the decay constant of a nuclide, $s^{-1}$, and a is the radius of the equivalent sphere, cm.

14. The method according to claim 12, wherein a formula for determining the ratio of the release rate to the birth rate is:

$$\frac{R}{B} = 3\left(\frac{1}{\Gamma_1}\left(\frac{\coth\sqrt{\mu_1}}{\sqrt{\mu_1}} - \frac{1}{\mu_1}\right) + \frac{1}{\Gamma_2}\left(\frac{\coth\sqrt{\mu_2}}{\sqrt{\mu_2}} - \frac{1}{\mu_2}\right)\right)f_{BU}$$

$$\Gamma_1 = 1 - \frac{\mu_1}{\mu_2}, \Gamma_2 = 1 - \frac{\mu_2}{\mu_1}, \mu_1 = \frac{\lambda_1}{D'_1}, \mu_2 = \frac{\lambda_2}{D'_2}$$

where:

R/B is the ratio of the release rate to the birth rate;

$f_{BU}$ is the fuel burnup correction factor, % FIMA;

$\Gamma_1$, $\Gamma_2$ and $\mu_1$, $\mu_2$ are the defined calculation parameters, whose subscripts 1, 2 denote the corresponding nuclide and parent nuclei of the nuclide;

$$D'_k = \frac{D_k}{a^2},$$

k=1,2, $D'_1$, $D'_2$ are the reduced diffusion coefficients of nuclides and parent nucleis of the nuclides, $s^{-1}$, and a is the radius of the equivalent sphere, cm, and the $D'_1$, $D'_2$ are determined based on the actual state information.

15. The method according to claim 12, wherein a formula for determining the ratio of the release rate to the birth rate is:

$$\frac{R}{B}\bigg|_{total} = \left(F(1 - C_{extra} - C_{nature})\frac{R}{B}\bigg|_{kernel} + C_{extra}\frac{R}{B}\bigg|_{extra} + C_{nature}\frac{R}{B}\bigg|_{nature}\right)$$

where:

$$\frac{R}{B}\bigg|_{total}$$

is the ratio of the release rate to the birth rate, $$\frac{R}{B}\bigg|_{kernel}$$

is the equivalent ratio of the release rate to the birth rate of the short-lived fission gas nuclide in the failed coated particles in the fuel elements in the core, $\frac{R}{B}|_{extra}$ is the equivalent ratio of the release rate to the birth rate of the short-lived fission gas nuclide from the uranium contamination in matrix graphite due to the process contamination during the manufacture of the fuel elements, $\frac{R}{B}|_{natrue}$ is the equivalent ratio of the release rate to the birth rate of the short-lived fission gas nuclide from natural uranium contamination in the fuel elements in the core, $$\frac{R}{B}|_{nature} = 0.9998\left(0.995\frac{R}{B}|_{grain} + 0.005\frac{R}{B}|_{amorphous}\right) + 0.0002,$$

where:

$\frac{R}{B}|_{grain}$ is the equivalent ratio of the release rate to the birth rate of the short-lived fission gas nuclides in the matrix graphite grain in the fuel elements, $\frac{R}{B}|_{amorphous}$ is the equivalent ratio of the release rate to the birth rate of the short-lived fission gas nuclide in the amorphous carbon in the fuel elements, $C_{extra}$ is uranium contamination in matrix graphite due to the process contamination during the manufacture of the fuel elements, $C_{natrue}$ is natural uranium contamination of the matrix graphite grain and amorphous carbon, $F \times (1-C_{natrue})$ is uranium fraction in the failed coated particles in which the short-lived fission gas nuclide will diffuse.

16. The method according to claim 15, wherein a formula for determining the $\frac{R}{B}|_{kernel}, \frac{R}{B}|_{extra}, \frac{R}{B}|_{natrue},$ and $\frac{R}{B}|_{amorphous}$ is:

$$\frac{R}{B}|_{kernel} = \sum_i f_{k,T_i} \frac{R}{B}|_{kernel,T_i}$$

$$\frac{R}{B}|_{extra} = \sum_i f_{k,T_i} \frac{R}{B}|_{extra,T_i}$$

$$\frac{R}{B}|_{grain} = \sum_i f_{c,T_i} \frac{R}{B}|_{grain,T_i}$$

$$\frac{R}{B}|_{amorphous} = \sum_i f_{c,T_i} \frac{R}{B}|_{amorphous,T_i}$$

where:

$\frac{R}{B}|_{kernel,T_i}, \frac{R}{B}|_{extra,T_i}, \frac{R}{B}|_{grain,T_i},$ and $\frac{R}{B}|_{amorphous,T_i}$ are equivalent ratios of the release rate to the birth rate of the short-lived fission gas nuclide at the temperature $T_i$ corresponding to the failed coated particles, $UO_2$ particles in the matrix graphite, matrix graphite grain, and amorphous carbon in the fuel elements in the core, respectively;

$f_{c,T_i}$ is the fraction of the matrix graphite in the core with the temperature of $T_i$; and $f_{k,T_i}$ is the fraction of the failed coated particles in the fuel elements with the temperature of $T_i$.

17. The method according to claim 10, wherein the migration model of the nuclide is:

$$\begin{cases} \frac{dC(t)}{dt} = \frac{R}{\lambda V} - \tau C(t) \\ C(0) = 0 \\ \tau = \lambda + \epsilon \frac{Q_\epsilon}{V} + \frac{\delta}{T} + \omega + \sigma_a \phi \frac{t_v}{T} \end{cases}$$

where, C is the atom concentration of a nuclide in helium coolant in the primary circuit, $cm^{-3}$, R is the release rate of a nuclide from the reactor core, Bq/s, $\lambda$ is the decay constant of a nuclide, $s^{-1}$, $\epsilon$ is the purification coefficient of a nuclide, Q is the purification flow rate of the helium purification system, $cm^3/s$, V is the total volume of helium in the primary circuit, L, $\delta$ is the deposition coefficient of a nuclide per cycle, T is the duration time per helium cycle, s, $\omega$ is the leakage rate of helium in the primary circuit, $s^{-1}$, $\sigma_a$ is the neutron absorption cross section of a nuclide, $cm^2$, $\Phi$ is the core effective neutron flux, $cm^{-2}s^{-1}$, $t_v$ is the duration time for helium across the core per cycle, s, and $\tau$ is the equivalent removal rate, $s^{-1}$.

18. The method according to claim 10, wherein the theoretical expression of the activity concentration is:

$$\begin{cases} C(t) = \frac{R}{\lambda V \tau}(1 - e^{-\tau t}) \\ A(t) = \lambda C(t) = \frac{R}{V \tau}(1 - e^{-\tau t}) \end{cases}$$

where, C is the atom concentration of a nuclide in helium coolant in the primary circuit, $cm^{-3}$, A is the theoretical expression of the activity concentration, Bq/L, R is the release rate of a nuclide from the reactor core, Bq/s, V is the total volume of helium in the primary circuit, L, and $\tau$ is the equivalent removal rate, $s^{-1}$, wherein C, A, R, $\lambda$ and $\tau$ of various nuclides are different, or, $$A(t) = \frac{R}{V\tau}$$

where, A is the theoretical expression of the activity concentration, Bq/L, R is the release rate of a nuclide from the reactor core, Bq/s, V is the total volume of helium in the primary circuit, L, and $\tau$ is the equivalent removal rate, $s^{-1}$.

19. The method according to claim 10, wherein obtaining the experimental measurement value of the activity concentration of the short-lived noble gas fission nuclide by sampling and measuring the gas at the inlet of the helium purification system comprises:
- setting an experimental loop at an inlet of the helium purification system to allow a portion of gas from the primary circuit to enter the experimental loop for a sampling time period and be stored in a sample tank;
- measuring the gas in the sample tank by a HPGe detector to obtain a γ spectrum;
- calibrating the γ spectrum to determine a nuclide in the gas and an activity of the nuclide; and
- correcting the sampling time period based on the nuclide and the activity of the nuclide to derive the experimental measurement value of the activity concentration of the short-lived fission gas nuclide.

20. A system for monitoring failure of coated particles in fuel elements in a core of a pebble-bed high-temperature gas-cooled reactor, comprising:
- a detector configured to obtain actual state information and an experimental measurement value of a pebble-bed high-temperature gas-cooled reactor from the pebble-bed high-temperature gas-cooled reactor in operation, and
- a processor connected to the detector, wherein the processor is configured to receive the actual state information and the experimental measurement value, and to execute a computer program to implement the method according to claim 10 based on the actual state information and the experimental measurement value, so as to determine a best estimate of the failure fraction F of the coated particles in the fuel elements for triggering audible and visual alarms and/or adjusting operating parameters of the pebble-bed high-temperature gas-cooled reactor.

* * * * *